US012688426B2

(12) United States Patent
Dong et al.

(10) Patent No.: US 12,688,426 B2
(45) Date of Patent: \*Jul. 21, 2026

(54) METHOD AND DEVICE FOR COMPRESSING NEURAL NETWORK

(71) Applicant: MONTAGE TECHNOLOGY CO., LTD., Shanghai (CN)

(72) Inventors: Zhen Dong, Shanghai (CN); Yuanfei Nie, Shanghai (CN); Huan Feng, Shanghai (CN)

(73) Assignee: MONTAGE TECHNOLOGY CO., LTD., Shanghai (CN)

( \* ) Notice: Subject to any disclaimer, the term of this patent is extended or adjusted under 35 U.S.C. 154(b) by 1063 days.

This patent is subject to a terminal disclaimer.

(21) Appl. No.: 17/533,082

(22) Filed: Nov. 22, 2021

(65) Prior Publication Data

US 2022/0164671 A1      May 26, 2022

(30) Foreign Application Priority Data

Nov. 20, 2020    (CN) .......................... 202011308961.0
Apr. 20, 2021    (CN) .......................... 202110425076.9

(51) Int. Cl.
  G06N 3/084    (2023.01)
  G06N 3/045    (2023.01)
    (Continued)
(52) U.S. Cl.
  CPC ..................................... G06N 3/084 (2013.01)
(58) Field of Classification Search
  CPC ....................................................... G06N 3/084
  See application file for complete search history.

(56) References Cited

U.S. PATENT DOCUMENTS

| | | | |
|---|---|---|---|
| 2019/0251445 A1 | 8/2019 | Movshovitz-Attias et al. | |
| 2020/0184333 A1* | 6/2020 | Oh .......................... | G06N 3/045 |

(Continued)

FOREIGN PATENT DOCUMENTS

| | | | |
|---|---|---|---|
| CN | 107239825 A | 10/2017 | |
| CN | 109002889 A | 12/2018 | |

(Continued)

OTHER PUBLICATIONS

Cai, Zhaowei, and Nuno Vasconcelos. "Rethinking differentiable search for mixed-precision neural networks." Proceedings of the IEEE/CVF Conference on Computer Vision and Pattern Recognition. 2020. (Year: 2020).*

(Continued)

*Primary Examiner* — Abdullah Al Kawsar
*Assistant Examiner* — Gary Mac
(74) *Attorney, Agent, or Firm* — Junhe Law Office P.C.; James J. Zhu

(57) ABSTRACT

A method for compressing a neural network includes: obtaining a neural network including a plurality of parameters to be compressed; dividing the parameters into J blocks; compressing a $j^{th}$ block with $K_j$ compression ratios to generate $K_j$ operation branches; obtaining $K_j$ weighting factors; replacing the $j^{th}$ block with the $K_j$ operation branches weighted by the $K_j$ weighting factors to generate a replacement neural network; performing forward propagation to the replacement neural network, a weighted sum operation being performed on $K_j$ operation results generated by the $K_j$ operation branches with the $K_j$ weighting factors and a result of the operation being used as an output; performing backward propagation to the replacement neural network, updated values of the $K_j$ weighting factors being calculated based on a model loss; and determining an operation branch (Continued)

corresponding to the maximum value of the updated values of the $K_j$ weighting factors as a compressed $j^{th}$ block.

18 Claims, 14 Drawing Sheets

(51) Int. Cl.

| | |
|---|---|
| *G06N 3/0464* | (2023.01) |
| *G06N 3/0495* | (2023.01) |
| *G06N 3/082* | (2023.01) |
| *G06N 3/09* | (2023.01) |
| *G06N 3/063* | (2023.01) |

(56) References Cited

U.S. PATENT DOCUMENTS

| | | | |
|---|---|---|---|
| 2021/0073644 A1 | 3/2021 | Lin et al. | |
| 2021/0303972 A1* | 9/2021 | Lee | G06N 3/0464 |
| 2022/0114479 A1* | 4/2022 | Zhao | G06N 3/0985 |

FOREIGN PATENT DOCUMENTS

| | | |
|---|---|---|
| CN | 111079899 A | 4/2020 |
| CN | 111242287 A | 6/2020 |
| CN | 111612143 A | 9/2020 |
| CN | 112488313 A | 3/2021 |

OTHER PUBLICATIONS

Li H, Kadav A, Durdanovic I, et al.,"Pruning filters for efficient convnets", [J]. arXiv preprint arXiv:1608.08710, 2016.

Blalock D, Ortiz J J G, Frankle J, et al. "What is the state of neural network pruning?" [J]. arXiv preprint arXiv:2003.03033, 2020.

Hanxiao Liu, Karen Simonyan, Yiming Yang, "Darts: Differentiable Architecture Search", arxiv preprint arxiv:1806.09055,2018.

Sun Yanli and Ye Jiongyao, Convolutional Neural Networks Compression Based on Pruning and Quantization, Computer Science, vol. 47, No. 8, Aug. 2020.

The Search Report for the counterpart Chinese patent application 202110425076.9, mailed on Jul. 25, 2025.

Zhong Jing, Model Compression Technique for Deep Neural Network, 2019.DOI:10.27266/d.cnki.gqhau.2019.000304. Tsinghua University.

The Search Report for the counterpart Chinese patent application 202110425076.9, mailed on Apr. 17, 2025.

Long, Xin et al, A Novel Low-Bit Quantization Strategy for Compressing Deep Neural Networks, Computational Intelligence and Neuroscience, vol. 2020.

* cited by examiner

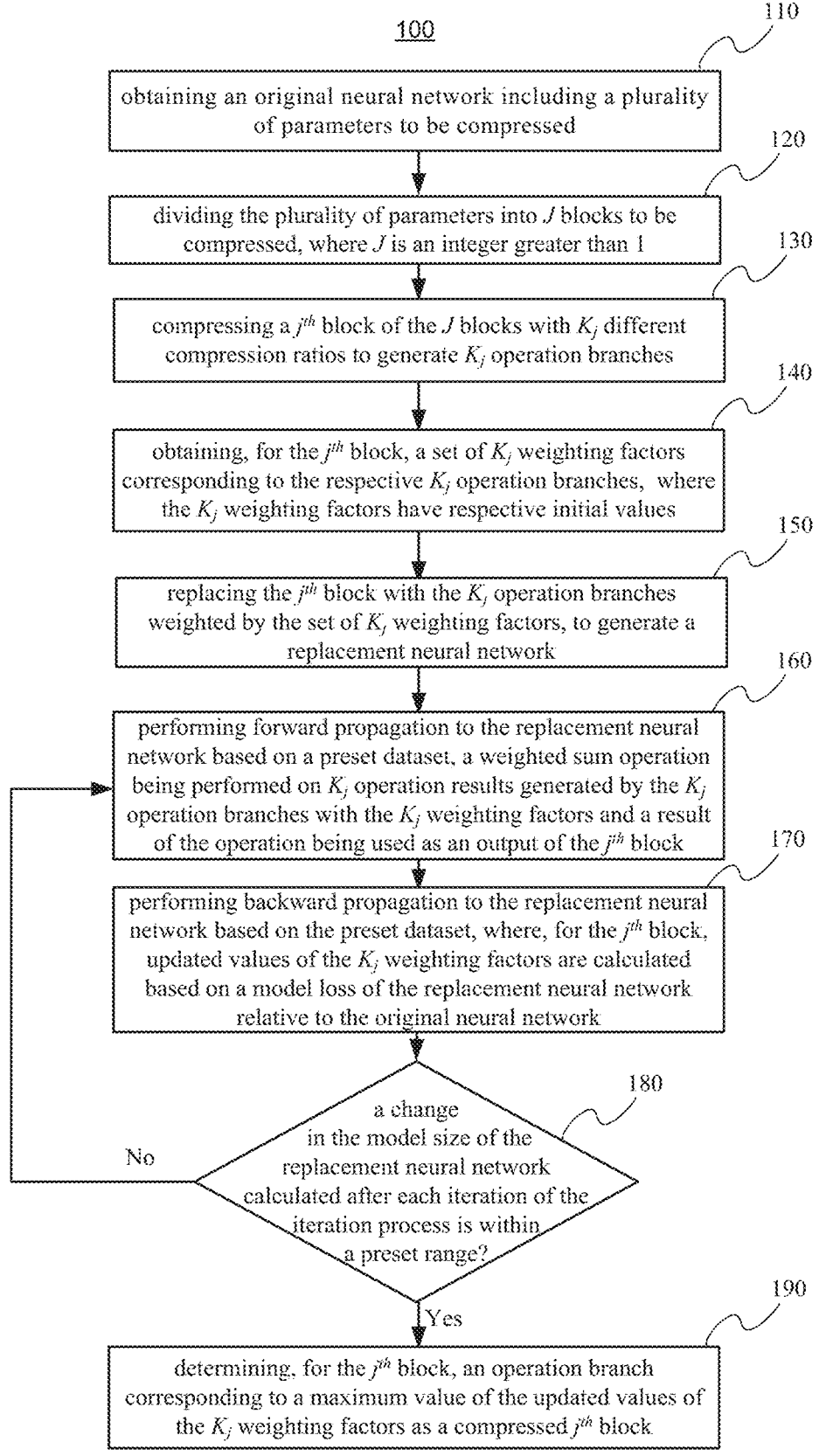

100

110 obtaining an original neural network including a plurality of parameters to be compressed

120 dividing the plurality of parameters into $J$ blocks to be compressed, where $J$ is an integer greater than 1

130 compressing a $j^{th}$ block of the $J$ blocks with $K_j$ different compression ratios to generate $K_j$ operation branches

140 obtaining, for the $j^{th}$ block, a set of $K_j$ weighting factors corresponding to the respective $K_j$ operation branches, where the $K_j$ weighting factors have respective initial values

150 replacing the $j^{th}$ block with the $K_j$ operation branches weighted by the set of $K_j$ weighting factors, to generate a replacement neural network

160 performing forward propagation to the replacement neural network based on a preset dataset, a weighted sum operation being performed on $K_j$ operation results generated by the $K_j$ operation branches with the $K_j$ weighting factors and a result of the operation being used as an output of the $j^{th}$ block

170 performing backward propagation to the replacement neural network based on the preset dataset, where, for the $j^{th}$ block, updated values of the $K_j$ weighting factors are calculated based on a model loss of the replacement neural network relative to the original neural network

180 a change in the model size of the replacement neural network calculated after each iteration of the iteration process is within a preset range?

No

Yes

190 determining, for the $j^{th}$ block, an operation branch corresponding to a maximum value of the updated values of the $K_j$ weighting factors as a compressed $j^{th}$ block

FIG. 1

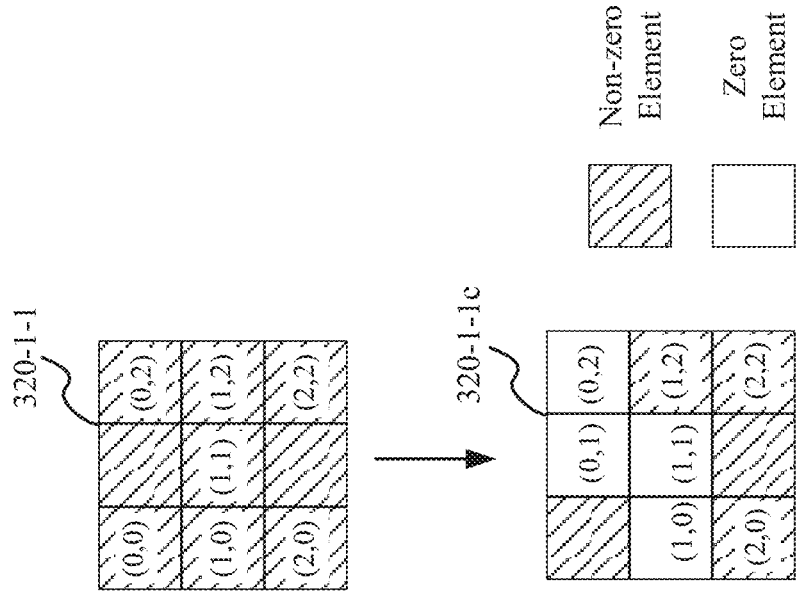
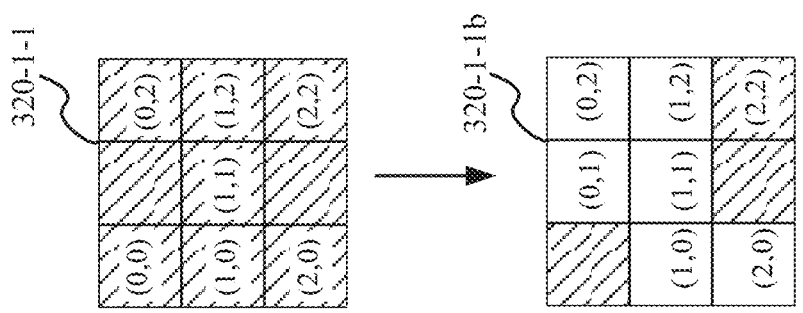
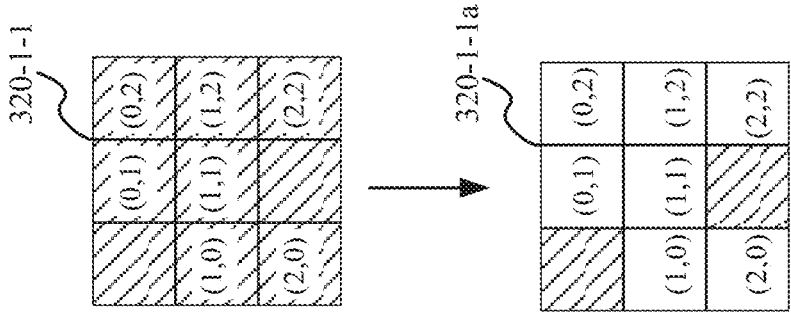
FIG. 4

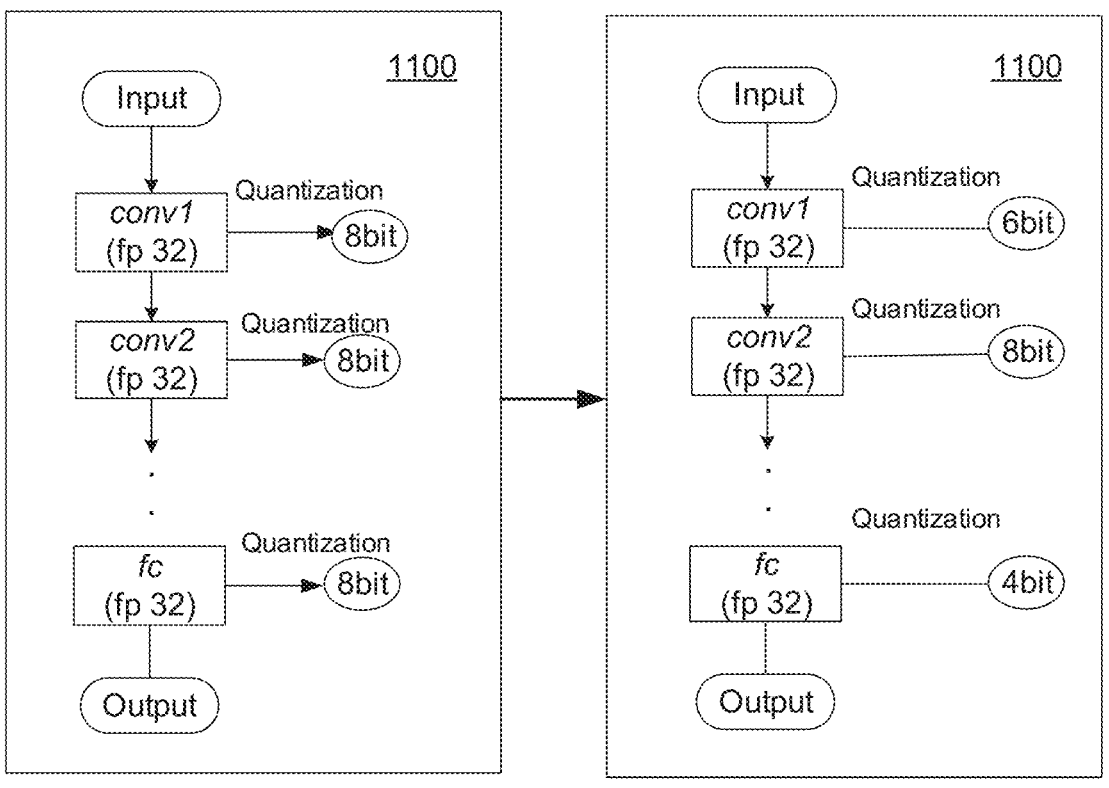
FIG. 11A                    FIG. 11B

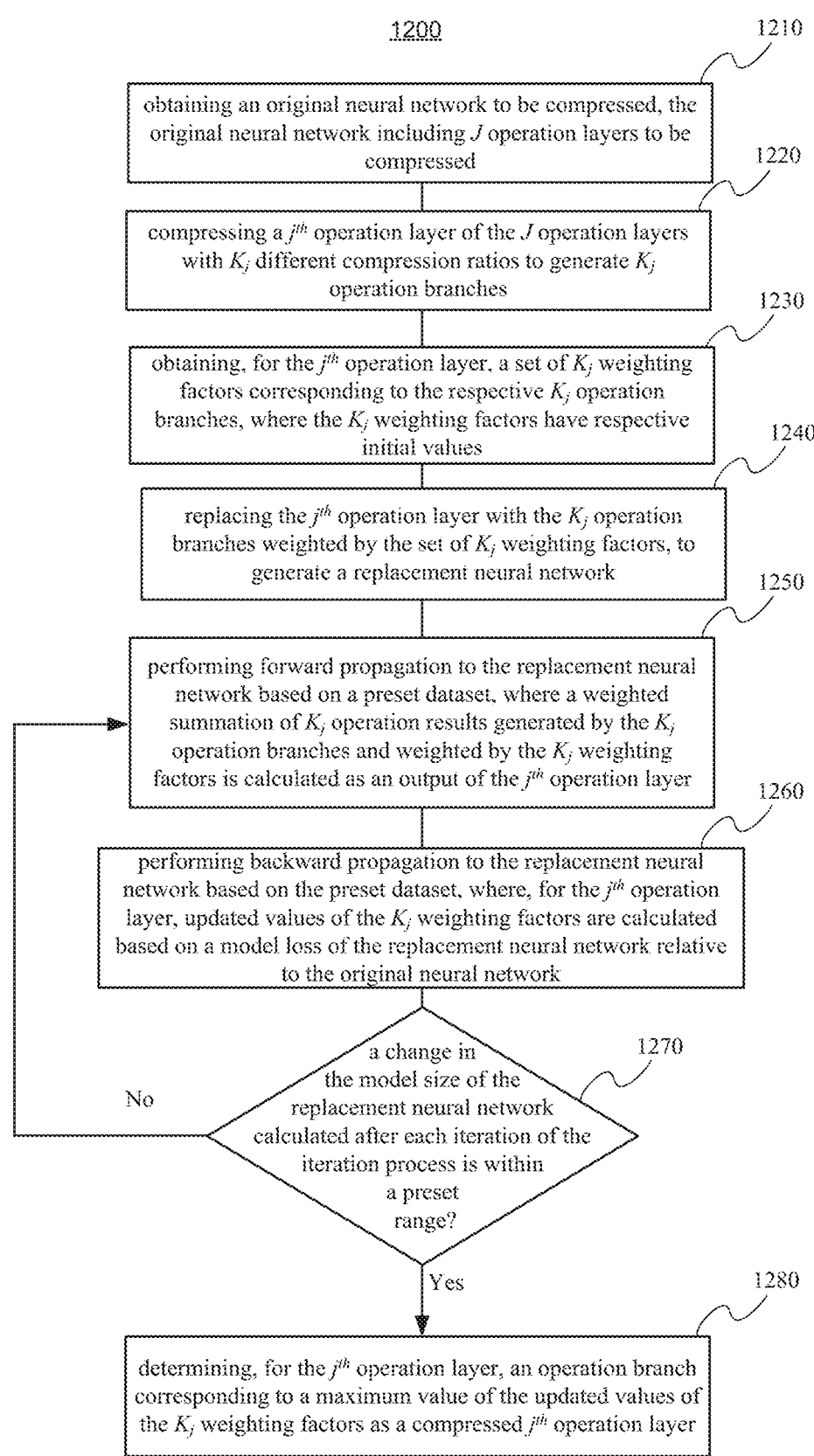

1200

1210 obtaining an original neural network to be compressed, the original neural network including $J$ operation layers to be compressed

1220 compressing a $j^{th}$ operation layer of the $J$ operation layers with $K_j$ different compression ratios to generate $K_j$ operation branches

1230 obtaining, for the $j^{th}$ operation layer, a set of $K_j$ weighting factors corresponding to the respective $K_j$ operation branches, where the $K_j$ weighting factors have respective initial values

1240 replacing the $j^{th}$ operation layer with the $K_j$ operation branches weighted by the set of $K_j$ weighting factors, to generate a replacement neural network

1250 performing forward propagation to the replacement neural network based on a preset dataset, where a weighted summation of $K_j$ operation results generated by the $K_j$ operation branches and weighted by the $K_j$ weighting factors is calculated as an output of the $j^{th}$ operation layer

1260 performing backward propagation to the replacement neural network based on the preset dataset, where, for the $j^{th}$ operation layer, updated values of the $K_j$ weighting factors are calculated based on a model loss of the replacement neural network relative to the original neural network a change in the model size of the replacement neural network calculated after each iteration of the iteration process is within a preset range?

1270

No

Yes

1280 determining, for the $j^{th}$ operation layer, an operation branch corresponding to a maximum value of the updated values of the $K_j$ weighting factors as a compressed $j^{th}$ operation layer

FIG. 12

METHOD AND DEVICE FOR COMPRESSING NEURAL NETWORK

CROSS REFERENCE TO RELATED APPLICATIONS

This application claims priority to Chinese patent application No. 202011308961.0 filed on Nov. 20, 2020, and Chinese patent application No. 202110425076.9 filed on Apr. 20, 2021, the entire contents of which are incorporated herein by reference.

TECHNICAL FIELD

This application relates to the field of neural network, and in particular, to a method and a device for compressing a neural network.

BACKGROUND

Nowadays, neural networks have been widely used in many technical fields, such as image recognition, voice recognition, autonomous driving, and medical imaging. For example, convolutional neural network (CNN) is a representative network structure and algorithm of the neural network technology, and has achieved great success in the image processing application. However, the neural network has too many computation layers and parameters, which take up a large amount of storage and computing resources, thereby limiting its application.

SUMMARY

An objective of the present application is to provide a method for compressing a neural network, which can obtain a higher compression ratio with less accuracy loss.

In an aspect of the application, a method for compressing a neural network is provided. The method may include: obtaining an original neural network to be compressed, the original neural network comprising a plurality of parameters to be compressed; dividing the plurality of parameters of the original neural network into J blocks to be compressed, where J is an integer greater than 1; compressing a $j^{th}$ block of the J blocks with $K_j$ different compression ratios to generate $K_j$ operation branches, where j and $K_j$ are integers, $1 \leq j \leq J$, and $K_j \geq 1$; obtaining, for the $j^{th}$ block, a set of $K_j$ weighting factors corresponding to the respective $K_j$ operation branches, where the $K_j$ weighting factors have respective initial values; replacing the $j^{th}$ block with the $K_j$ operation branches weighted by the set of $K_j$ weighting factors, to generate a replacement neural network; performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ block; performing backward propagation to the replacement neural network based on the preset dataset, where, for the $j^{th}$ block, updated values of the $K_j$ weighting factors are calculated based on a model loss of the replacement neural network relative to the original neural network; and determining, for the $j^{th}$ block, an operation branch corresponding to a maximum value of the updated values of the $K_j$ weighting factors as a compressed $j^{th}$ block.

In another aspect of the application, a device for compressing a neural network is provided. The device may include: a processor; and a memory, wherein the memory stores program instructions that are executable by the processor, and when executed by the processor, the program instructions cause the processor to perform the method above to compress a neural network.

In another aspect of the application, a non-transitory computer-readable storage medium is provided. The non-transitory computer-readable storage medium has stored therein instructions that, when executed by a processor, cause the processor to perform the method above to compress a neural network.

In still another aspect of the application, a device for compressing a neural network is provided. The device may include a first obtaining unit, a division unit, a compressing unit, a second obtaining unit, a replacing unit, a forward propagation unit, a backward propagation unit, and a determining unit. The first obtaining unit is configured for obtaining an original neural network to be compressed, the original neural network comprising a plurality of parameters to be compressed. The division unit is configured for dividing the plurality of parameters of the original neural network into J blocks to be compressed, where J is an integer greater than 1. The compressing unit is configured for compressing a $j^{th}$ block of the J blocks with $K_j$ different compression ratios to generate $K_j$ operation branches, where j and $K_j$ are integers, $1 \leq j \leq J$, and $K_j \geq 1$. The second obtaining unit is configured for obtaining, for the $j^{th}$ block, a set of $K_j$ weighting factors corresponding to the respective $K_j$ operation branches, where the $K_j$ weighting factors have respective initial values. The replacing unit is configured for replacing the $j^{th}$ block with the $K_j$ operation branches weighted by the set of $K_j$ weighting factors, to generate a replacement neural network. The forward propagation unit is configured for performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ block. The backward propagation unit is configured for performing backward propagation to the replacement neural network based on the preset dataset, where, for the $j^{th}$ block, updated values of the $K_j$ weighting factors are calculated based on a model loss of the replacement neural network relative to the original neural network. The determining unit is configured for determining, for the $j^{th}$ block, an operation branch corresponding to a maximum value of the updated values of the $K_j$ weighting factors as a compressed $j^{th}$ block.

In the technical solution of the present application, weighting factors are introduced in the process of compressing a neural network, blocks to be compressed with different compression ratios are retrained on a preset dataset to update the weighting factors based on a model loss, and then an operation branch corresponding to a maximum value of updated values of the weighting factors is determined as the compressed block, so that the accuracy loss of the neural network model and the model size can be balanced and the amount of calculation is greatly reduced.

In addition, when compressing a neural network, the technical solution of the present application can update the preset compression ratios, and expand a search range of available compression ratios, so that a better compression ratio can be selected for the block to be compressed.

The foregoing is a summary of the present application and may be simplified, summarized, or omitted in detail, so that a person skilled in the art shall recognize that this section is merely illustrative and is not intended to limit the scope of the application in any way. This summary is neither intended to define key features or essential features of the claimed subject matter, nor intended to be used as an aid in determining the scope of the claimed subject matter.

BRIEF DESCRIPTION OF THE DRAWINGS

The abovementioned and other features of the present application will be more fully understood from the following specification and the appended claims, taken in conjunction with the drawings. It can be understood that these drawings depict several embodiments of the present application and therefore should not be considered as limiting the scope of the present application. By applying the drawings, the present application will be described more clearly and in detail.

FIG. 1 illustrates a flowchart of a method for compressing a neural network according to an embodiment of the present application.

FIG. 4 illustrates a schematic diagram of compressing convolution kernels with different compression ratios.

FIG. 11A and FIG. 11B illustrate schematic diagrams of a uniform quantization scheme in prior art and a hybrid quantization scheme of the present application, respectively.

FIG. 12 illustrates a flowchart of a method for compressing a neural network according to an embodiment of the present application.

DETAILED DESCRIPTION

Figure 2:
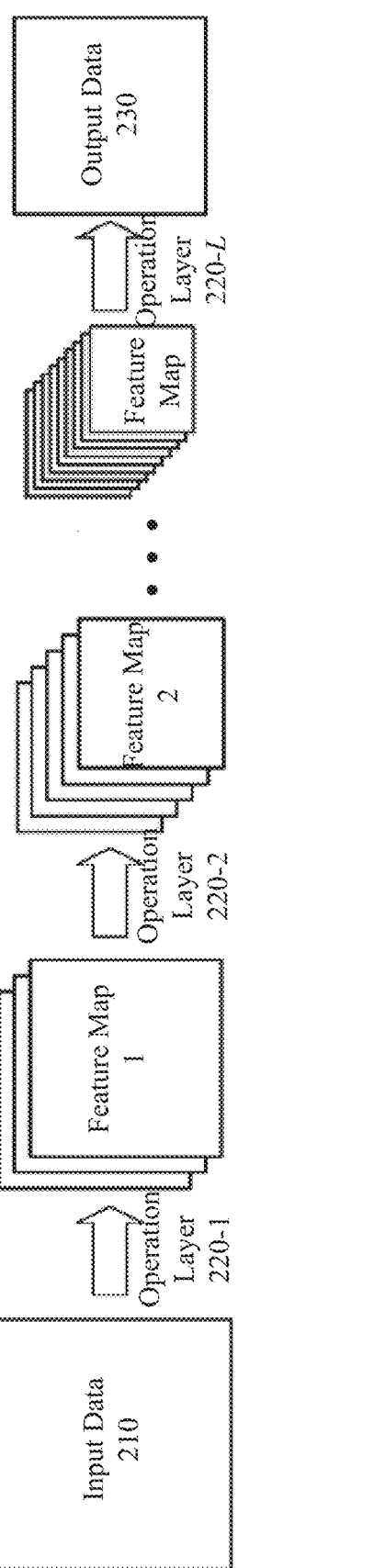
FIG. 2 illustrates a schematic diagram of an exemplary neural network.

The following detailed description refers to the drawings that form a part hereof. In the drawings, similar symbols generally identify similar components, unless context dictates otherwise. The illustrative embodiments described in the description, drawings, and claims are not intended to limit. Other embodiments may be utilized and other changes may be made without departing from the spirit or scope of the subject matter of the present application. It can be understood that numerous different configurations, alternatives, combinations and designs may be made to various aspects of the present application which are generally described and illustrated in the drawings in the application, and that all of which are expressly formed as part of the application.

In order to facilitate deployment of a neural network on hardware, neural networks are usually compressed, such as being pruned and quantized. Specifically, neural network pruning refers to an operation of pruning elements in the neural network that do not contribute to or contribute less to output accuracy of the neural network (for example, setting them to zero), so as to compress the neural network. Structured pruning is a special form of pruning, in which the pruned elements has certain regularity in the computing space, thereby further improving a running speed of the pruned neural network on the hardware. Taking a convolutional layer as an example, a common operation in the structured pruning is to prune an entire convolution kernel or an entire filter. Generally, before the pruning operation, a sensitivity analysis is needed to determine a compression ratio for each convolutional layer. A higher compression ratio is set for a convolutional layer that has a greater impact on the output accuracy of the neural network, and less weight values are pruned. A lower compression ratio is set for a convolutional layer that has less impact on the output accuracy of the neural network, and more weight values are pruned. Then, based on the compression ratio of each convolutional layer, a pruning operation is performed on several convolution kernels or several filters in the convolutional layer. It should be noted that the compression ratio refers to a ratio of a data size after compression to a data size before compression in this application.

The inventors of the present application have found that, the structured pruning method in the prior art has many disadvantages. First, the sensitivity analysis should be performed on each operation layer of the neural network. That is, each operational layer should be compressed with different compression ratios, and the output accuracy of the neural network should be determined under the different compression ratios of each operational layer, thereby causing a large amount of calculation. Although the number of compression ratios can be reduced to decrease the amount of calculations, the accuracy of the sensitivity analysis to the operation layer will decrease accordingly. Second, the sensitivity analysis in the prior art is independently performed on each operation layer. However, there is usually a coupling effect among the operation layers of the neural network, and the sensitivity analysis in the prior art does not consider an influence of the coupling effect on the sensitivity of each operation layer. Third, there is usually a positive correlation between the compression ratio and the sensitivity of the operation layer, but it is hard to quantify the correlation between the compression ratio and the sensitivity. In actual operation, this correlation is usually set based on a technician's experience, thereby limiting its application.

In view of the above, the present application provides a method for compressing a neural network. In this method, after obtaining an original neural network to be compressed, a plurality of parameters to be compressed in the original neural network is divided into a plurality of blocks to be compressed, and each block is compressed with one or more different compression ratios to generate one or more operation branches corresponding to the block. Then, one or more weighting factors corresponding to the one or more operation branches are generated for each block, and the neural network is retrained based on a preset dataset, including performing forward propagation and backward propagation to the neural network. In the forward propagation process, for each block, the one or more operation branches are used to replace the block, and a weighted sum operation is performed on one or more operation results generated by the one or more operation branches with the one or more weighting factors and a result of the weighted sum operation is used as an output of the block. In the backward propagation process, updated values of the one or more weighting factors are calculated based on a model loss related to performance of the neural network. Then, for each block, an operation branch corresponding to the maximum value of the updated values of the one or more weighting factors is determined as a compressed block, so as to form a compressed neural network. By introducing the weighting factors, the method can retrain the neural network based on a small dataset of training samples, update the weighting factors based on the model loss, and select the operation branch corresponding to the largest weighting factor in each block as the compressed block. Therefore, a suitable compression ratio that can take into account the accuracy of the neural network is selected for the blocks. Compared with the aforementioned brute force search, the method of the present application reduces the amount of calculation significantly. Compared with the method in the prior art that determines sensitivities of each operation layer under different compression ratios, the method of the present application reduces the amount of calculation significantly. That is because the weighting factors of the plurality of blocks to be compressed can be updated at the same time, and the coupling effect among the plurality of blocks is taken in consideration. Further, in the method of the present application, since the weighting factors are updated based on the model loss, rather than the technician's experience, manual participation is reduced, and thus the method of the present application can be widely used.

The method for compressing a neural network of the present application will be described in detail below with reference to the drawings. FIG. 1 illustrates a flowchart of a method 100 for compressing a neural network according to an embodiment of the present application, which specifically includes the following blocks 110-190.

In block 110, an original neural network is obtained, where the original neural network includes a plurality of parameters to be compressed.

In some embodiments, the original neural network may be a deep neural network (DNN) obtained after being trained on a dataset of training samples, such as a convolutional neural network (CNN), a recurrent neural network (RNN), a deep belief network (DBN), a restricted Boltzmann machine (RBM), a fully connected network (FCN), a deep convolutional network (DCN), a long short-term memory (LSTM) network, or a gated recurrent unit (GRU).

FIG. 2 illustrates a schematic diagram of an exemplary original neural network. The original neural network which is to be compressed includes a plurality of operation layers 220-1, 220-2, . . . , 220-L for sequentially processing input data 210 received by the neural network, and outputting output data 230 after processing. In some embodiments, the original neural network may be a convolutional neural network, such as LeNet, AlexNet, VGGNet, GoogLeNet, ResNet, or other types of convolutional neural networks. The plurality of operation layers may include a convolutional (Conv) layer, a batch normalization (BN) layer, an activation layer (for example, ReLU layer), a pooling layer, a fully connected layer, and/or other types of operation layers. Each operation layer may include one or more operation channels, each operation channel may include one or more operation kernels, each operation kernel may include one or more parameters to be compressed, and different operation layers may include different types or numbers of parameters used in the operation of the original neural network. Taking a convolutional layer as an example, the convolutional layer may include a plurality of filters (i.e., operation channels), each filter may include a plurality of convolution kernels (i.e., operation kernels), and each convolution kernel may include a plurality of weighting values (i.e., parameters) arranged in an array (for example, a matrix with 3×3, 5×5, or 7×7 weighting values). These weighting values are used as parameter values of the convolutional layer to be used in the operation of the original neural network. For image processing convolutional neural networks, the input data 210 may be an image represented by pixel matrixes including a plurality of different color channels (for example, R, G, and B color channels). The operation layer 220-1 may be a convolutional layer, which includes one or more filters to perform convolution operations on the input data 210 to generate a plurality of feature maps 1 as outputs of the operation layer 220-1. Then, the feature maps 1 are provided to the next block 220-2 (for example, a batch normalization layer, an activation layer, a pooling layer, or a fully connected layer) and are used as input data for further processing, so as to generate a plurality of feature maps 2. Some other operation layers perform their respective operations similarly until the processing layer 220-L generates output data 230, where L may be an integer greater than 1. Depending on the application type of the convolutional neural network, the output data 230 may change. For example, in an image classification neural network, the output data 230 may indicate that objects in the input image can be classified into a plurality of different classification types. Also, in an image detection network, the output data 230 may represent a detection result of an object in the input image. In other embodiments, the input data 210 and the output data 230 may be voice data, text data, etc., depending on the specific application scenarios of the convolutional neural network. It should be noted that, although the above embodiments are described by taking a convolutional neural network as an example, it could be appreciated that the method for compressing a neural network in the present application can be applied to any neural network that includes at least an operation layer to be compressed.

In some embodiments, the original neural network may include one or more operation layers to be compressed, each operation layer may include one or more operation channels to be compressed, each operation channel may include one or more operation kernels to be compressed, and each operation kernel may include one or more parameters to be compressed. In some embodiments, parameters of all the operation layers in the original neural network may be the parameters to be compressed. In some embodiments, only parameters of part of the operation layers, part of the operation channel, or part of the operation core in the original neural network may be the parameters to be compressed. It may vary based on the feature of the original neural network or specific application requirements whether to compress all the parameters in the original neural network, or parameters of which operation layers, operation channels or operation cores are to be selected for compression.

In block 120, the plurality of parameters to be compressed are divided into J blocks to be compressed, where J is an integer greater than 1.

In some embodiments, dividing the plurality of parameters to be compressed into J blocks to be compressed may refer to: dividing parameters in the same operation layer into a respective block to be compressed. For example, if the original neural network includes L operation layers to be compressed, the J blocks to be compressed refers to the L operation layers to be compressed.

Taking FIG. 2 as an example, if parameter in all the operation layers 220-1, 220-2, . . . , 220-L are parameters to be compressed, parameters to be compressed in the operation layer 220-1 is taken as a single block to be compressed, parameters to be compressed in the operation layer 220-2 is taken as another single block to be compressed, . . . , and so on, until J blocks to be compressed are generated. In this case, J=L.

In some embodiments, dividing the plurality of parameters to be compressed into J blocks to be compressed may refer to: dividing parameters in the same operation channel into a respective block to be compressed. For example, if the original neural network includes L operation layers to be compressed each of which includes C operation channels to be compressed, the J blocks to be compressed refers to L×C operation channels to be compressed.

Figure 3:
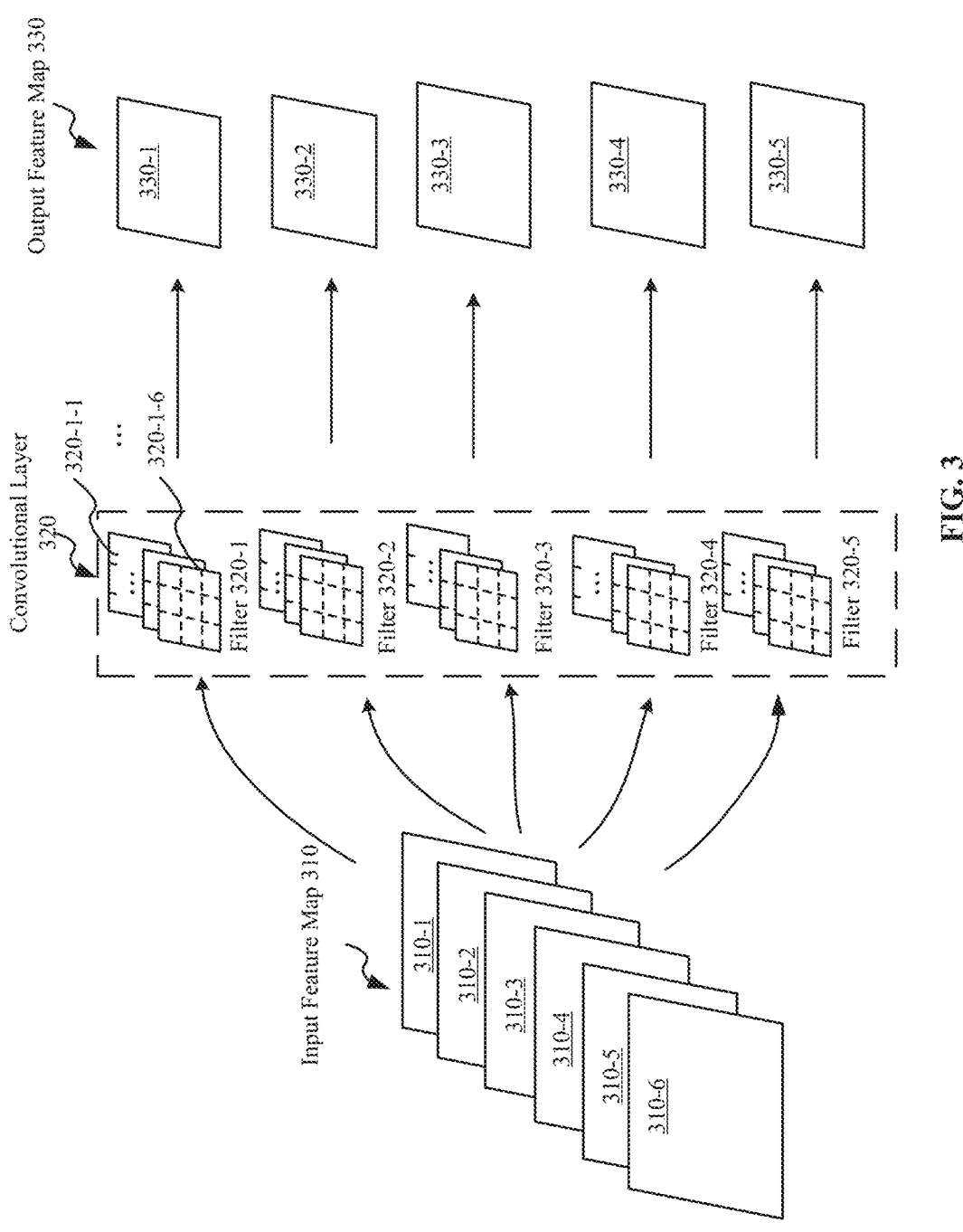
FIG. 3 illustrates a schematic diagram of an exemplary convolutional layer.

Referring to FIG. 3, a convolutional layer 320 is taken as an example to illustrate the operation layers shown in FIG. 2. The convolutional layer 320 may be a certain operation layer shown in FIG. 2.

As shown in FIG. 3, the convolutional layer 320 is between an input feature map 310 and an output feature map 330, and is used to perform convolution operations on the input feature map 310 to generate an operation result represented by the output feature map 330. In the example shown in FIG. 3, the convolutional layer 320 may include 5 operation channels (namely, filters 320-1, 320-2, 320-3, 320-4 and 320-5), which perform convolution operations on data of the input feature map 310 respectively, and the operation results are represented by $\alpha$ output channels 330-1, 330-2, 330-3, 330-4 and 330-5 of the output feature map 330. Each of the filters 320-1, 320-2, 320-3, 320-4 and 320-5 may include 6 convolution kernels. These 6 convolution kernels may be used to perform convolution operations with the 6 input channels 310-1, 310-2, 310-3, 310-4, 310-5 and 310-6 of the input feature map 310, respectively. Each convolution kernel may include 9 weight values arranged in 3 rows and 3 columns.

Taking FIG. 3 as an example, if all weight values in filters 320-1, 320-2, 320-3, 320-4 and 320-5 of the convolutional layer 320 are parameters to be compressed, weight values in the filter 320-1 is taken as a single block to be compressed, weight values in the filter 320-2 is taken as another single block to be compressed, . . . , and so on, until 5 blocks to be compressed are generated for the convolutional layer 320. Besides the convolutional layer 320, similar operations can be performed on other operation layers of the original neural network to obtain blocks to be compressed.

In some embodiments, dividing the plurality of parameters to be compressed into J blocks to be compressed may refer to: dividing parameters in the same operation kernel into a respective block to be compressed. For example, if the original neural network includes L operation layers to be compressed, each operation layer to be compressed includes C operation channels to be compressed, and each operation channel to be compressed includes Q operation kernels to be compressed, the J blocks to be compressed refers to L×C×Q operation kernels to be compressed.

Continuing to FIG. 3, if all weight values in filters 320-1, 320-2, 320-3, 320-4 and 320-5 of the convolutional layer 320 are parameters to be compressed, and each filter includes 6 convolution kernels, 30 (i.e., 5×6) blocks to be compressed may be generated after dividing weight values in each operation kernel into a respective block to be compressed. Besides the convolutional layer 320, similar operations can be performed on other operation layers of the original neural network to obtain blocks to be compressed.

In some embodiments, dividing the plurality of parameters to be compressed into J blocks to be compressed may include: dividing parameters to be compressed in two or more adjacent operation layers, operation channels or operation kernels into a single block to be compressed. In some embodiments, dividing the plurality of parameters to be compressed into J blocks to be compressed may include: dividing parameters to be compressed in two or more operation layers, operation channels or operation kernels, that are not adjacent but of the same type, into a single block to be compressed. For example, parameters to be compressed in two or more convolutional layers may be divided into a single block to be compressed. By dividing parameters to be compressed in two or more operation layers, operation channels or operation kernels into a single block to be compressed, unnecessary intermediate output can be reduced, and computing efficiency can be improved.

In the above embodiments, the parameters to be compressed are divided into different numbers of blocks to be compressed based on different "granularities" (that is, taking the operation layer, the operation channel or the operation kernel as a unit). A finer granularity helps to obtain a lower compression ratio, but will increase the amount of calculation. Therefore, in practical applications, the granularity for dividing the parameters into blocks to be compressed may be adjusted based on the feature of the original neural network or specific application requirements. Although the operation of dividing the plurality of parameters to be compressed into a plurality of blocks to be compressed is described in conjunction with FIG. 2 and FIG. 3 according to different embodiments, the specific numbers of the input feature maps, the output feature maps, the convolutional layers, the filters, the convolution kernels or the weight values in FIG. 2, FIG. 3 and other figures are only exemplary, and it could be appreciated that the above numbers may vary in other embodiments.

In block 130, the $j^{th}$ block to be compressed among the J blocks is compressed with $K_j$ different compression ratios to generate $K_j$ operation branches, respectively, where j and $K_j$ are integers, $1 \leq j \leq J$, and $K_j \geq 1$.

Before compressing the $j^{th}$ block to be compressed with $K_j$ different compression ratios, it is necessary to set the number and values of the different compression ratios in advance. The number of compression ratios (i.e., $K_j$) may be 2, 3, 4, 5, 6, 7 or other suitable values. The number of compression ratios may affect the number of operation branches generated subsequently. If the number is too large, the amount of calculations and the memory consumption will significantly increase; but if the number is too small, it may not be able to filter out optimal compression ratios for the blocks to be compressed. The values of the compression ratios may be 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or other suitable values. If the value of the compression ratio is set too large, a desired compression effect cannot be achieved, but if the value of the compression ratio is set too small, the output accuracy of the entire neural network will decreases too much. Therefore, in different embodiments, the number and the values of the compression ratios should be determined according to features of different blocks to be compressed or specific application requirements. The number and/or the values of the compression ratios of different blocks to be compressed may be equal or unequal.

In some embodiments, the $K_j$ compression ratios of the $j^{th}$ block have respective initial values $R_j$, $R_j+\Delta$, $R_j+2\Delta$, . . . , $R_j+(K_j-1)\Delta$, where $0<R_j<1$, $0<\Delta<1$, and $0<(R_j+(K_j-1)\Delta)<1$. That is, the multiple different compression ratios of a same block to be compressed form an arithmetic sequence. In an example, $K_j=3$, $R_j=0.2$, and $\Delta=0.15$. Namely, the corresponding three different compression ratios are 0.2, 0.35 and 0.5.

If the $K_j$ compression ratios are set as an arithmetic sequence, the value of each compression ratio can be set or adjusted by setting the values of $R_j$ and $\Delta$, instead of setting values of the $K_j$ compression ratios one by one. This is especially convenient in the case of a large number of compression ratios. It should be noted that $\Delta$ is a difference between compression ratios of two adjacent operation branches in the block to be compressed, and can be regarded as a scan step in a process for finding an appropriate compression ratio for the block to be compressed. A smaller scan step may help to find the appropriate compression ratio, but will increase the amount of calculation. Thus, in different embodiments, the value of $\Delta$ may be determined according to features of different blocks to be compressed or specific application requirements.

It should be noted that the multiple compression ratios in the form of arithmetic sequence are only exemplary. In other embodiments, different methods may be used to select $K_j$ different compression ratios from 0 to 1 for the $j^{th}$ block. The present application is not limited a specific selection method.

After determining $K_j$ different compression ratios for the $j^{th}$ block, the $K_j$ different compression ratios are used to compress the $j^{th}$ block to generate $K_j$ operation branches. Corresponding to different embodiments in block 120, in which the parameters to be compressed are divided into J blocks to be compressed (for example, L operation layers to be compressed, L×C operation channels to be compressed, or L×C×Q operation kernels to be compressed) based on different "granularities", methods for compressing the J (J=L) operation layers to be compressed, the J (J L×C) operation channels to be compressed, or the J (J=L×C×Q) operation kernels to be compressed may be different.

In an embodiment of dividing parameters in the same operation layer into a respective block to be compressed, first, L1 norms of all operations channels of the $j^{th}$ block are calculated respectively, and then $P_1$, $P_2$, . . . , $P_{Kj}$ operations channels with the smallest L1 norms are selected from all operations channels of the $j^{th}$ block based on the $K_j$ compression ratios of the $j^{th}$ block respectively. Specifically, $K_j$ numbers of operation channels to be retained can be determined based on the $K_j$ compression ratios; then the $K_j$ numbers of the operation channels to be retained are respectively subtracted from the total number of operation channels to generate $K_j$ numbers of operation channels that need to be compressed (i.e., $P_1$, $P_2$, . . . , $P_{Kj}$); and then values of all parameters in the $P_1$, $P_2$, . . . , $P_{Kj}$ operations channels of the $j^{th}$ operation layer to be compressed are set to zero to generate the $K_j$ operation branches, respectively. More specifically, the convolutional layer 320 shown in FIG. 3 is taken as an example of the $j^{th}$ operation layer to be compressed. First, L1 norms of all filters 320-1, 320-2, 320-3, 320-4 and 320-5 are calculated respectively. For example, absolute values of all weight values in the 6 convolution kernels of the filter 320-1 are added to obtain L1 norm of the filter 320-1, and similar operations may performed on the other filters 320-2, 320-3, 320-4 and 320-5 to obtain their respective L1 norms. Assuming that $K_j=3$ and the three different compression ratios corresponding to the convolutional layer 320 are 0.2, 0.35 and 0.5, the three different compression ratios 0.2, 0.35 and 0.5 may be used to compress the convolutional layer 320. For example, the three different compression ratios 0.2, 0.35 and 0.5 may be used to determine the numbers of filters that need to be retained in the 3 operation branches generated subsequently to be (5×0.2), (5×0.35) and (5×0.5), respectively. After rounded to the nearest integer, it can be determined that the numbers of filters that need to be retained in the 3 operation branches is 1, 2 and 3 respectively, and the numbers of filters that need to be pruned in the 3 operation branches are 4, 3 and 2 respectively. Next, 4, 3 and 2 filters with the smallest L1 norms are selected from the 5 filters 320-1, 320-2, 320-3, 320-4 and 320-5, that is, $P_1=4$, $P_2=3$ and $P_3=2$. Assuming that the L1 norms of the five filters are sorted from small to large in order of the filter 320-1, the filter 320-2, the filter 320-3, the filter 320-4 and the filter 320-5, all weight values of 4 filters with the smallest L1 norms (i.e., 320-1, 320-2, 320-3 and 320-4) are set to zero to generate a first operation branches, all weight values of 3 filters with the smallest L1 norms (i.e., 320-1, 320-2 and 320-3) are set to zero to generate a second operation branches, and all weight values of 2 filters with the smallest L1 norms (i.e., 320-1 and 320-2) are set to zero to generate a third operation branches.

In an embodiment of dividing parameters in the same operation channel into a respective block to be compressed, first, L1 norms of all operations kernels of the $j^{th}$ block are calculated respectively, and then $P_1$, $P_2$, . . . , $P_{Kj}$ operations kernels with the smallest L1 norms are selected from all operations kernels of the $j^{th}$ block based on the $K_j$ compression ratios of the $j^{th}$ block respectively. Specifically, $K_j$ numbers of operation kernels to be retained can be determined based on the $K_j$ compression ratios; then the $K_j$ numbers of the operation kernels to be retained are respectively subtracted from the total number of operation kernels to generate $K_j$ numbers of operation kernels that need to be compressed (i.e., $P_1$, $P_2$, . . . , $P_{Kj}$); and then values of all parameters in the $P_1$, $P_2$, . . . , $P_{Kj}$ operations kernels of the $j^{th}$ operation channel to be compressed are set to zero to generate the $K_j$ operation branches, respectively. More specifically, the filter 320-1 shown in FIG. 3 is taken as an example of the $j^{th}$ operation channel to be compressed. First, L1 norms of all 6 convolution kernels (i.e., the convolution kernel 320-1-1 to the convolution kernel 320-1-6) are calculated respectively. For example, absolute values of 9 weight values in each convolution kernel are added to obtain L1 norm of the convolution kernel. Assuming that $K_j=3$ and the three different compression ratios corresponding to the filter 320-1 are 0.2, 0.35 and 0.5, the three different compression ratios 0.2, 0.35 and 0.5 may be used to compress the filter 320-1. For example, the three different compression ratios 0.2, 0.35 and 0.5 may be used to determine the numbers of convolutional kernels that need to be retained in the 3 operation branches generated subsequently to be (6×0.2), (6×0.35) and (6×0.5), respectively. After rounded to the nearest integer, it can be determined that the numbers of convolutional kernels that need to be retained in the 3 operation branches is 1, 2 and 3 respectively, and the numbers of convolutional kernels that need to be pruned in the 3 operation branches are 5, 4 and 3 respectively. Next, 5, 4 and 3 convolutional kernels with the smallest L1 norms are selected from the 6 convolutional kernels, that is, $P_1=5$, $P_2=4$ and $P_3=3$. Accordingly, all weight values of 5 convolutional kernels with the smallest L1 norms are set to zero to generate a first operation branches, all weight values of 4 convolutional kernels with the smallest L1 norms are set to zero to generate a second operation branches, and all weight values of 2 convolutional kernels with the smallest L1 norms are set to zero to generate a third operation branches.

In an embodiment of dividing parameters in the same operation kernel into a respective block to be compressed, first, absolute values of all parameters of the $j^{th}$ block are calculated respectively, and then $P_1, P_2, \ldots, P_{Kj}$ parameters with the smallest absolute values are selected from all parameters of the $j^{th}$ block based on the $K_j$ compression ratios of the $j^{th}$ block respectively. Specifically, $K_j$ numbers of parameters to be retained can be determined based on the $K_j$ compression ratios; then the $K_j$ numbers of the parameters to be retained are respectively subtracted from the total number of parameters to generate $K_j$ numbers of parameters that need to be compressed (i.e., $P_1, P_2, \ldots, P_{Kj}$); and then values of the $P_1, P_2, \ldots, P_{Kj}$ parameters of the $j^{th}$ operation kernel to be compressed are set to zero to generate the $K_j$ operation branches, respectively. More specifically, referring to both FIG. 3 and FIG. 4, a first convolution kernel 320-1-1 of the filter 320-1 shown in FIG. 3 is taken as an example of the $j^{th}$ operation kernel to be compressed. First, absolute values of 9 weight values in the convolution kernel 320-1-1 are calculated respectively. Assuming that $K_j=3$ and the three different compression ratios corresponding to the convolution kernel 320-1-1 are 0.2, 0.35 and 0.5, the three different compression ratios 0.2, 0.35 and 0.5 may be used to compress the convolution kernel 320-1-1. For example, the three different compression ratios 0.2, 0.35 and 0.5 may be used to determine the numbers of weight values that need to be retained in the 3 operation branches generated subsequently to be (9×0.2), (9×0.35) and (9×0.5), respectively. After rounded to the nearest integer, it can be determined that the numbers of weight values that need to be retained in the 3 operation branches is 2, 3 and 5 respectively, and the numbers of weight values that need to be pruned in the 3 operation branches are 7, 6 and 4 respectively. Next, 7, 6 and 4 weight values with the smallest absolute values are selected from the 9 weight values, that is, $P_1=7$, $P_2=6$ and $P_3=4$. Assuming that 7 weight values with the smallest absolute values in the 9 weight value of the convolution kernel 320-1-1 are at positions (0, 1), (0, 2), (1, 0), (1, 1), (1, 2), (2, 0) and (2, 2) of the convolution kernel 320-1-1 in an order from small to large, these 7 weight values with the smallest absolute values are set to zero to generate a first operation branches 320-1-1$a$, 6 weight values with the smallest absolute values (i.e., the weight values at positions (0, 1), (0, 2), (1, 0), (1, 1), (1, 2) and (2, 0)) are set to zero to generate a second operation branches 320-1-1$b$, and 4 weight values with the smallest absolute values (i.e., the weight values at positions (0, 1), (0, 2), (1, 0) and (1, 1)) are set to zero to generate a third operation branches 320-1-1$c$.

It should be noted that, in the above embodiments, when determining the $P_1, P_2, \ldots, P_{Kj}$ operations channels, operation kernels or parameters with the smallest L1 norms based on the $K_j$ compression ratios of the $j^{th}$ operation layer, operation channel or operation kernel to be compressed, the results are rounded to the nearest integers. In some other embodiments, the results may be rounded up or rounded down.

In block 140, a set of $K_j$ weighting factors corresponding to the respective $K_j$ operation branches are obtained for the $j^{th}$ operation layer to be compressed, where the $K_j$ weighting factors have respective initial values.

In some embodiments, the initial values of the weighting factors may be automatically generated by software. In other embodiments, the initial values of the weighting factors may be predetermined and provided by a user. Since the sensitivity of each operation layer, each operation channel or each operation kernel to the compression ratio is unknown before the neural network is retrained, in a preferred embodiment, the initial values of the $K_j$ weighting factors corresponding to the respective $K_j$ operation branches, which represent different compression ratio, are set to be equal to each other.

Continuing to the example where $K_j=3$, and 3 different compression ratios of 0.2, 0.35 and 0.5 are used to compress the 3 operation branches, 3 weighting factors may be obtained for the 3 operation branches, and may be represented by $\beta_1$, $\beta_2$ and $\beta_3$, respectively. In an embodiment, initial values of these 3 weighting factors may be set to zero. It could be appreciated that, in other examples, the initial values of the weighting factors can also be set to other equal or unequal values.

In block 150, for the $j^{th}$ block to be compressed, the block to be compressed is replaced with the $K_j$ operation branches weighted by the set of $K_j$ weighting factors to generate a replacement neural network.

Figures 5A, 5B:
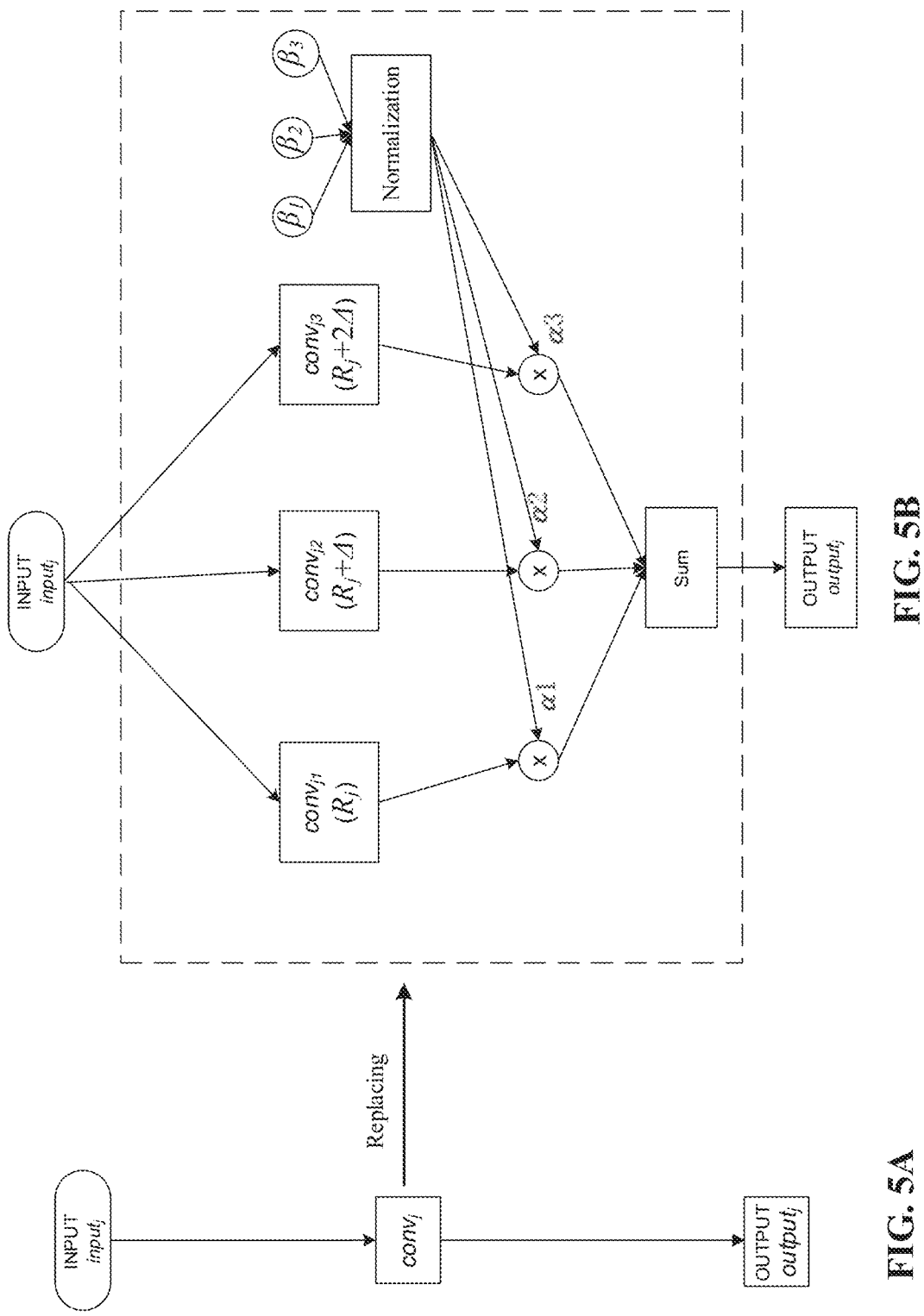
FIG. 5A and FIG. 5B illustrate block diagrams of forward propagation to a neural network according to an embodiment of the present application.

Referring to FIG. 5A and FIG. 5B, the convolutional channel $conv_j$ is taken as an example of the $j^{th}$ block of the original neural network. Assuming that 3 different compression ratios (for example, $R_j$, $R_j+\Delta$ and $R_j+2\Delta$) are used to compress the $j^{th}$ convolutional channel and 3 operation branches $conv_{j1}$, $conv_{j2}$ and $conv_{j3}$ are generated, the $j^{th}$ convolutional channel $conv_j$ is replaced with the 3 operation branches weighted by the 3 weighting factors ($\beta_1$, $\beta_2$ and $\beta_3$), i.e., $\beta_1 conv_{j1}$, $\beta_2 conv_{j2}$, and $\beta_3 conv_{j3}$. After completing the above replacement operation for all the J blocks to be compressed, a replacement neural network is generated.

Although the foregoing description has been made by taking the block being a convolutional channel as an example, it could be appreciated that similar replacement operations can also be implemented for a convolutional layer or a convolutional kernel, and for a corresponding operation layer, operation channel or operation kernel of a batch normalization layer, an activation layer, or a fully connected layer.

Continuing to FIG. 1, in block 160, forward propagation to the replacement neural network is performed based on a preset dataset, where a weighted sum operation is performed on the $K_j$ operation results generated by the $K_j$ operation branches with the $K_j$ weighting factors and a result of the weighted sum operation is used as an output of the $j^{th}$ block.

In some embodiments, the preset dataset may be a dataset different from the above dataset of training samples which are used to train the neural network. The preset dataset may include a plurality of training samples, and each sample includes an input object and an expected output value. The forward propagation to the neural network based on the preset dataset can generate an output value for the input object of each sample. By comparing the output value with the expected output value, the accuracy of the neural network can be evaluated. For example, for an image classification network, the input object is an image, the output of forward propagation indicates that objects in the input image is classified into a plurality of different classification types. Based on the comparison between the classification types indicated by the output with the expected classification types, the parameters of the image classification network can be adjusted and the performance of the image classification network can be evaluated. Similarly, if the neural network is used in a speech recognition system, the input object is a speech sample, and the expected output is a corresponding text. In some examples, the above preset dataset may be an ImageNet dataset, a CIFAR10 dataset, or the like. It could be appreciated that those skilled in the art could select any suitable dataset for retraining the neural network according to specific applications, which will not be elaborated herein.

Continuing to FIG. 5A and FIG. 5B, the forward propagation to the replacement neural network is further described by replacing the block $conv_j$ with three operation branches $conv_{j1}$, $conv_{j2}$ and $conv_{j3}$ weighted by 3 weighting factors $\beta_1$, $\beta_2$ and $\beta_3$ as an example. Specifically, FIG. 5A illustrates a normal forward propagation process to the $j^{th}$ block $conv_j$, and FIG. 5B illustrates the forward propagation to the three operation branches $conv_{j1}$, $conv_{j2}$ and $conv_{j3}$ weighted by 3 weighting factors $\beta_1$, $\beta_2$ and $\beta_3$ (i.e., $K_j$=3), which replace the $j^{th}$ block $conv_j$.

In FIG. 5A and FIG. 5B, $input_j$ represents input data of the $j^{th}$ block. First, certain operations may be performed on the $K_j$ replaced operation branches and the $K_j$ input data $input_j$ to generate operation results corresponding to the $K_j$ operation branches. A weighted sum operation is performed on the $K_j$ operation results with the corresponding $K_j$ weighting factors to generate a summation, and the summation may be used as an output result of this block. Taking the $j^{th}$ block being a convolutional channel $conv_j$ as an example, the above operations can be given by Equation (1):

$$output_j = \sum_{k=1}^{K_j} \alpha_{jk} * (conv_{jk} \circ input_j) \tag{1}$$

In Equation (1), "$conv_{jk} \circ input_j$" represents a convolution operation performed on the $k^{th}$ convolution branch $conv_{jk}$ in the $j^{th}$ block and the input data $input_j$, and $\alpha_{jk}$ is a normalized representation of the weighting factor $\beta_{jk}$, which represents the $k^{th}$ normalized weighting factor in the $j^{th}$ block. In some examples, the normalization of the weighting factor $\beta_{jk}$ can be performed by using the following "softmax" function, that is, the following Equation (2):

$$\alpha_{jk} = \frac{e^{\beta_{jk}}}{\sum_{k=1}^{K_j} e^{\beta_{jk}}} \tag{2}$$

$$(k = 1, 2, \cdots, K_j)$$

It could be appreciated that those skilled in the art can understand that the weighting factor $\beta_{jk}$ can also be normalized by using other functions according to specific applications.

Continuing to taking FIG. 5B as an example, when $K_j$=3, the above Equation (1) can be expressed as the following Equation (3):

$$output_j = \tag{3}$$
$$\alpha_{j1} * (conv_{j1} \circ input_j) + \alpha_{j2} * (conv_{j2} \circ input_j) + \alpha_{j3} * (conv_{j3} \circ input_j)$$

The specific operation process will not be elaborated herein.

It should be noted that, the block to be compressed is taken as a convolutional channel for description in the examples of FIG. 5A and FIG. 5B, but it could be appreciated that the forward propagation to a convolutional layer or a convolutional kernel, and to a corresponding operation layer, operation channel or operation kernel of an activation layer, a fully connected layer or the like can be performed in a similar manner.

In block 170, the backward propagation to the replacement neural network is performed based on the preset dataset, where, for the $j^{th}$ block to be compressed, updated values of the $K_j$ weighting factors are calculated based on a model loss of the replacement neural network relative to the original neural network.

Compressing the parameters of the original neural network may result in a loss of accuracy of the original neural network, while computing and storage resources may be saved. Therefore, the replacement neural network can be backward-propagated to adjust its parameters, and reduce its accuracy loss. It should be noted that, when performing backward propagation to the replacement neural network, the technical solution of the present application only adjusts and updates weighting factors of each block to be compressed, but does not adjust other parameters of the neural network (for example, weighting values of the convolutional layer).

In some embodiments, when performing backward propagation to the replacement neural network, the $K_j$ weighting factors of the $j^{th}$ block to be compressed can be updated according to the following Equation (4):

$$\beta'_{jk} = \beta_{jk} - \lambda \frac{\partial Loss}{\partial \beta_{jk}}, \tag{4}$$

$$(k = 1, ..., K_j)$$

In Equation (4), $\beta_{jk}$ represents an initial value of the $k^{th}$ weighting factor of the $j^{th}$ block, $\beta'_{jk}$ represents an updated value of the $k^{th}$ weighting factor of the $j^{th}$ block, Loss represents a function of model loss of the replacement neural network relative to the original neural network, and represents a learning rate and can be defined by the user.

In some embodiments, the model loss function Loss includes a loss function part and a performance index term. Specifically, the loss function part is related to an application type of the neural network, such as classification, positioning, detection or segmentation. The performance index part is related to a hardware index of the hardware platform on which the neural network is to be deployed, such as a storage space, a number of floating-point operations, a delay time or a power consumption, etc.

The following takes the compression of a storage space of a classification neural network on the hardware platform as an example to illustrate the model loss function Loss. Specifically, the model loss function Loss can be given by the following Equation (5):

$$Loss = loss1 + loss2 \qquad (5)$$

In Equation (5), loss1 represents a loss function part, and loss2 represents a performance index part.

For the classification neural network, the loss function part loss1 can be further given by a cross-entropy function as shown in Equation (6):

$$Loss1 = CrossEntropy(pred, \text{label}) = -\sum_{i}^{I} \text{label}(i)\log(pred(i)), \qquad (6)$$

$$(i = 1, ..., I)$$

In Equation (6), label represents a classification label, which is usually represented by a one-hot code; I represents a total dimension of the classification labels, for example, for the ImageNet dataset, the total dimension of the classification labels I is 1000; label (i) represents the $i^{th}$ classification label of all I classification labels, where if the $i^{th}$ classification is true, label (i) is 1, otherwise label (i) is 0; and, correspondingly, pred (i) represents a probability that the $i^{th}$ classification is true.

The performance index part loss2 can be further given by a model size function shown in Equation (7):

$$loss2 = \left(model\_size/model\_ref\right)^{\gamma} \qquad (7)$$

In Equation (7), model_size represents a model size of the neural network in training, whose unit is "bit". model_ref represents the expected model size of the neural network after compression. $\gamma$ is a hyper-parameter, which is used to balance the accuracy loss of the neural network model and the model size. When a neural network model with higher accuracy is required, the value of $\gamma$ can be set smaller, and when a smaller neural network model is required, the value of $\gamma$ can be set larger. That is, the value of $\gamma$ can be determined according to specific requirements. In some examples, the value of $\gamma$ ranges 0.05 to 5. More specifically, in some examples, the value of $\gamma$ ranges 2 to 3, which can balance the accuracy loss of the neural network model and the model size better.

In some embodiments, the model size model_size of the neural network in training in the above Equation (7) can be expressed by the following Equation (8):

$$model\_size = \sum_{j=1}^{J}\sum_{k=1}^{K_j} \alpha_{jk} * size(conv_{jk}) \qquad (8)$$

In Equation (8), J represents the total number of blocks to be compressed in the neural network. j represents a series number of each block to be compressed, and $1 \leq j \leq J$. $K_j$ represents a total number of operational branches in the $j^{th}$ block to be compressed, k represents a series number of the operational branch in this block, and $1 \leq k \leq K_j$. $conv_{jk}$ represents a convolutional layer of the $k^{th}$ operational branch in the $j^{th}$ block. size ($conv_{jk}$) represents a number of bits of the convolutional layer $conv_{jk}$. Referring to the example shown in FIG. 5B, the values (i.e., size ($conv_{j1}$), size ($conv_{j2}$) and size ($conv_{j3}$)) corresponding to the 3 operation branches of the $j^{th}$ layer are equal to the numbers of nonzero weight values of respective operation branches multiplied by bit-width of the nonzero weight values (for example, 32, 16, 8 or 4). In addition, $\alpha_{jk}$ represents a normalized weighting factor corresponding to the $k^{th}$ operation branch in the $j^{th}$ block, which can be obtained by the above Equation (2).

The above example illustrates the model loss function Loss by taking the compression of a storage space of the classification neural network on the hardware platform as an example. It could be appreciated that, the model loss function Loss can be adjusted according to specific application scenarios. In some embodiments, the loss function part loss1 in the model loss function Loss may be adjusted according to the application type of the neural network (for example, classification, positioning, detection, segmentation, etc.). Taking image processing as an example, the classification neural network can be used to determine the classification of a given image; the positioning neural network can be used to determine a specific location of a target in the given image; the detection neural network can be used to identify and locate a target in a given image when a target type and number are uncertain; and the segmentation neural network can divide the given image into multiple components, which can be used to locate a boundary of the target in the image. Similar to the above-mentioned classification neural network, in which the loss function part loss1 is related to the classification labels and the probability of each recognized classification, when adjusting the loss function part loss1, the positioning neural network needs to consider the location parameters of the target in the image, the detection neural network needs not only to consider the type and number of targets, but also to consider positions of these targets in the image; and the segmentation neural network needs to consider the position and shape parameters of the target in the image. In some embodiments, according to the specific application type of the neural network, the loss function part loss1 may include one or more of a group consisting of the following: a cross-entropy function, an absolute value loss function, a logarithmic loss function, a square loss function, an exponential loss function, a hinge loss function, a perceptron function or other suitable loss functions. Correspondingly, the performance index part loss2 in the model loss function Loss can be adjusted according to the hardware index of the hardware platform to be deployed (for example, a storage space, a number of floating-point operations, a delay time or a power consumption, etc.). For example, if an index related to a number of floating-point operations, a delay time, or a power consumption of the compressed neural network is set for the hardware platform to be deployed, the model_size and model_ref parts related to the storage space in Equation (7) can be replaced with parameters related to the number of floating-point operations, the delay time or the power consumption, thereby forming the adjusted performance index part loss2.

In some embodiments, after block 170 is completed, the operation branch corresponding to the maximum value of the updated values of the $K_j$ weighting factors may be determined as the compressed $j^{th}$ block, and the J blocks to be compressed are replaced with J compressed blocks, so as to obtain the compressed neural network. This can reduce the amount of calculations required to compress the neural network.

In the embodiment shown in FIG. 1, after block 170, the replacement neural network can be further retrained one or more times based on the preset dataset to obtain a compressed neural network with better performance.

In block 180, the forward propagation and the backward propagation to the replacement neural network are iteratively performed for multiple times based on the preset dataset. During the iteration process, a model size of the replacement neural network is calculated based on the operation branch corresponding to the maximum value of the updated values of the $K_j$ weighting factors, and it is determined whether a change in the model size of the replacement neural network calculated after each iteration of the iteration process is within a preset range. If the change is within the preset range, the method proceed with block 190. If the change is not within the preset range, the method 100 goes back to block 160, and continues to iteratively performing the forward propagation and backward propagation blocks.

An objective of retraining the replacement neural network based on the preset dataset (including forward propagation and backward propagation) is to update the multiple weighting factors assigned to the plurality of blocks to be compressed, so as to reach a tradeoff between the accuracy loss of the replacement neural network and the model size, to get an optimized hybrid compression scheme. During the iteration process, for the $j^{th}$ block to be compressed, the updated values of the $K_j$ weighting factors obtained in a backward propagation can serve as weighting factors to be used in a forward propagation next to the backward propagation. After the forward propagation and backward propagation to the above replacement neural network are iteratively performed for a plurality of times, if a change in the model size of the replacement neural network calculated after an iteration of the iteration process is within a preset range, it means that the training process tends to converge and can be ended; otherwise, it is desired to continue training the replacement neural network, and continue to perform the forward propagation and backward propagation to update the weighting factors.

It should be noted that, for the first operation of the forward propagation and backward propagation, since there is no previous iteration process, an initial model size of the original neural network can be used as the model size of the neural network before the first operation, and such initial model size can be used to calculate a change in the model size of the replacement neural network after the first operation of the forward propagation and backward propagation.

It should also be noted that, in some cases, there may be a situation where the retraining process does not converge. That is, the above change cannot converge within the preset range after multiple iterations. Thus, a maximum number of iterations can be preset. After the number of iterations reaches the maximum number of iterations, the method may be forced to exit from the iteration process, and the retraining of the replacement neural network is ended.

In some embodiments, the model size of the replacement neural network can be calculated according to the following Equation (9):

$$\text{model\_size}' = \sum_{j=1}^{J}\sum_{k=1}^{K_j} \alpha_{jk}' * \text{size}(conv_{jk}) \tag{9}$$

The same symbols in Equation (8) and Equation (9) have the same meaning, model_size' represents the model size of the replacement neural network, which is determined by the following Equation (10).

$$\alpha_{jk}' = \begin{cases} 1, & \left(k = \underset{k=1,\dots,K_j}{\operatorname{argmax}} \beta_{jk}\right) \\ 0, & \left(k \neq \underset{k=1,\dots,K_j}{\operatorname{argmax}} \beta_{jk}\right) \end{cases} \tag{10}$$

In Equation (10), the operator "arg max" represents taking the maximum value of the $K_j$ weighting factors. In other words, when calculating the model size of the replacement neural network, only the size of the convolutional layer of the operation branch corresponding to the largest weighting factor among all the operation branches in each block to be compressed is included in the model size of in the replacement neural network, and other operation branches are discarded. The size of the replacement neural network model can be calculated during each iteration through the above Equations (9) and (10). Then, a difference between two model sizes of the respective replacement neural networks calculated in two adjacent iterations of the iteration process is compared with a range preset by the user. If the difference is within the preset range, it means that there is no change or the change is small to the model size of the replacement neural networks before and after the iteration, the training can be ended. Otherwise, the replacement neural network is further trained based on the preset dataset.

In block 190, for the $j^{th}$ block to be compressed, the operation branch corresponding to the maximum value of the updated values of the $K_j$ weighting factors is determined as the compressed $j^{th}$ block.

As mentioned above, when the replacement neural network is retrained based on the preset dataset and the convergence condition is reached, it means that the accuracy loss and the model size of the replacement neural network have been relatively balanced. For the $j^{th}$ block to be compressed, the operation branch corresponding to the maximum value of the updated values of the $K_j$ weighting factors can be directly determined as the $j^{th}$ compressed block, and accordingly the J blocks to be compressed are replaced with J compressed blocks, so as to obtain the compressed neural network.

In the embodiments described in conjunction with FIG. 1, multiple different compression ratios may be applied to each block to be compressed, and a subsequent neural network retraining process may be performed to select an optimal compression ratio from the multiple different compression ratios for compressing this block. However, since the multiple different compression ratios are preset, there may be a compression ratio better than these preset compression ratios. Therefore, it is necessary to update the multiple different compression ratios when appropriate to find a better compression ratio for the block to be compressed.

Figure 6:
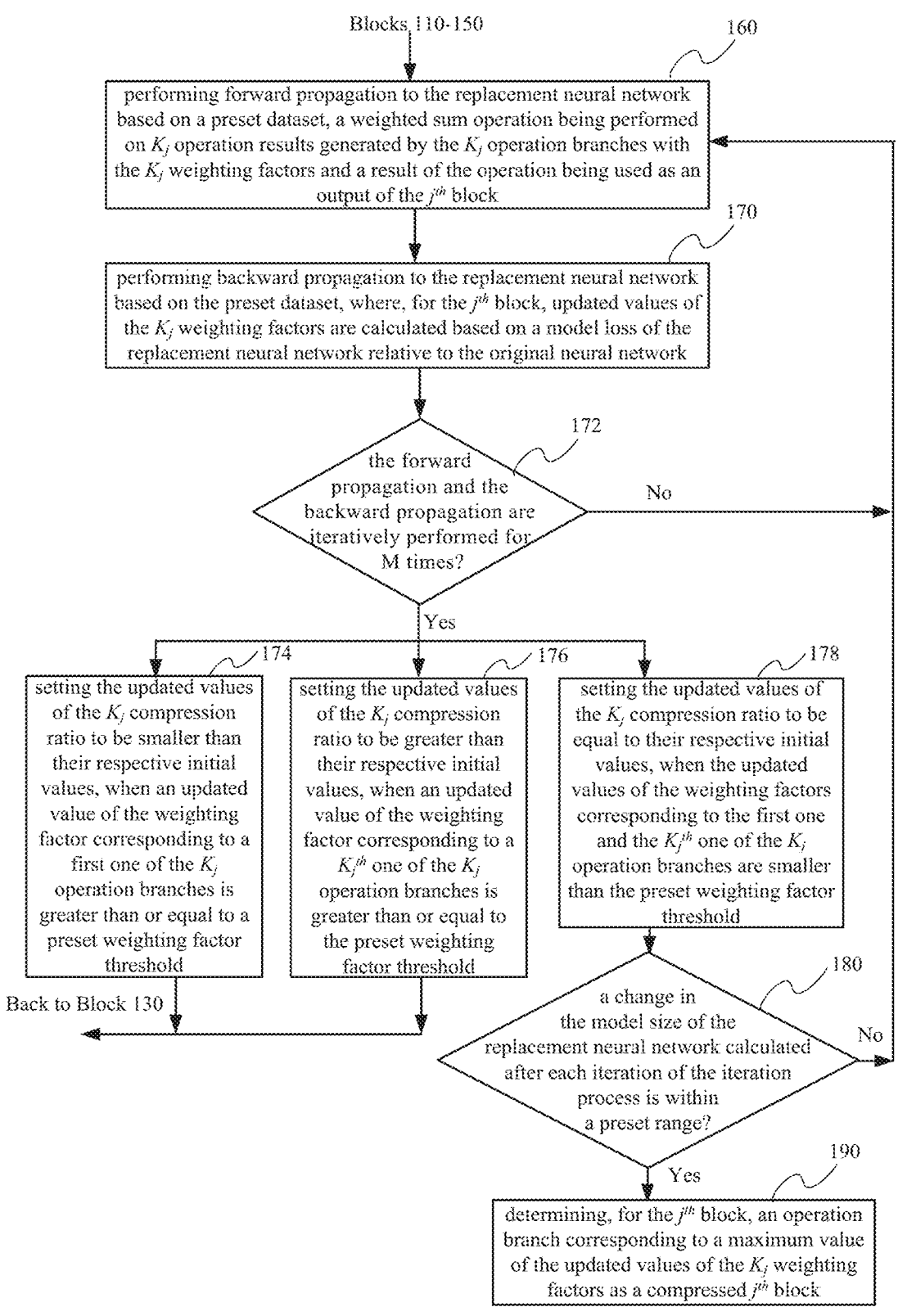
FIG. 6 illustrates a flowchart of a method for updating compression ratios according to an embodiment of the present application.

Based on the above considerations, in some embodiments of the present application, blocks 172 to 178 may be performed between block 170 and block 180 to update the multiple different compression ratios of each block to be compressed, as shown in FIG. 6.

For simplicity and clarity, blocks 110 to 150 are not shown in FIG. 6, and blocks 160, 170, 180, and 190 which are similar to corresponding blocks in FIG. 1 will not be elaborated herein.

In block 172, the forward propagation and the backward propagation to the replacement neural network are iteratively performed for multiple times based on the preset dataset; and in the iteration process of the forward propagation and the backward propagation, the updated values of the $K_j$ weighting factors obtained in a backward propagation may serve as weighting factors to be used in a forward propagation next to the backward propagation. After each iteration process, it is determined whether a number of iterations reaches a preset number M. If the number of iterations reaches the preset number M, one of blocks 174, 176 and 178 is selected for execution, and if the number of iterations doesn't reach the preset number M, the method goes back block 160 and continues to iteratively performing the forward propagation and back propagation blocks. The preset number M may be is an integer greater than 1. For example, the preset number M ranges from 3 to 20. More specifically, in some examples, the preset number M may be 3, 5 or 10.

After the forward propagation and the backward propagation to the replacement neural network are iteratively performed for M times, the update values of weighting factors corresponding to each operation branch in the replacement neural network tend to be stable, and it can be determined based on these update values of weighting factors whether and how to update of these weighting factors. Specifically, in some embodiments, for the $j^{th}$ block, it may be determined whether or how to update the $K_j$ compression ratios by comparing the updated values of the $K_j$ weighting factors with a preset weighting factor threshold. The preset weighting factor threshold may be set according to the number $K_j$ of weighting factors of the block to be compressed. For example, the preset weighting factor threshold may be greater than $1/K_j$ and less than 1. Blocks 174, 176 and 178 will be described below by taking the $K_j$ compression ratios having respective initial values $R_j$, $R_j+\Delta$, $R_j+2\Delta$, . . . , $R_j+(K_j-1)\Delta$ as an example. It could be appreciated that, even if the $K_j$ compression ratios have other values that do not form an arithmetic sequence, the $K_j$ compression ratios can also be sorted from small to large and then updated by the operations in blocks 174 to 178.

In block 174, when an updated value of the weighting factor corresponding to a first operation branch of the $K_j$ operation branches is greater than or equal to the preset weighting factor threshold, the updated values of the $K_j$ compression ratio are set to be smaller than their respective initial values. If the updated value of the weighting factor corresponding to the first operation branch of the $K_j$ operation branches (i.e., the operation branch with the smallest compression ratio $R_j$) is greater than or equal to the preset weighting factor threshold, it may mean that the $j^{th}$ block to be compressed tends to use the smallest one of all the $K_j$ compression ratios for compression. Therefore, it is necessary to provide a smaller compression ratio for the $j^{th}$ block to determine whether there is a compression ratio less and better than $R_j$ for the $j^{th}$ block. Specifically, a predetermined value (for example, J) may be subtracted from respective initial values of the $K_j$ compression ratios. If a result of subtracting the predetermined value from the smallest compression ratio $R_j$ is greater than 0, the differences between the $K_j$ initial values and the predetermined value may be used as updated values of the $K_j$ weighting factors. In some other cases, if the result of subtracting the predetermined value from the smallest compression ratio $R_j$ is equal to or less than 0, it may mean that the current $K_j$ compression ratios are the smallest compression ratios within an allowable range, and thus the updated values of the $K_j$ compression ratio are set to be equal to their respective initial values. In other words, the initial values of the $K_j$ compression ratios remain unchanged. After block 174, the method goes back to block 130, in which the $j^{th}$ block of the J blocks is compressed with the updated values of the $K_j$ compression ratios to generate $K_j$ updated operation branches. Then, in block 140, the $K_j$ weighting factors are reset to their initial values, and will be updated in subsequent retraining processes, which will not be elaborated herein.

In block 176, when an updated value of the weighting factor corresponding to a $$K_j^{th}$$

operation branch of the $K_j$ operation branches is greater than or equal to the preset weighting factor threshold, the updated values of the $K_j$ compression ratio are set to be greater than their respective initial values. If the updated value of the weighting factor corresponding to the $$K_j^{th}$$

operation branch of the $K_j$ operation branches (i.e., the operation branch with the largest compression ratio $R_j+(K_j-1)\Delta$) is greater than or equal to the preset weighting factor threshold, it may mean that the $j^{th}$ block to be compressed tends to use the largest one of all the $K_j$ compression ratios for compression. Therefore, it is necessary to provide a larger compression ratio for the $j^{th}$ block to determine whether there is a compression ratio larger and better than $R_j+(K_j-1)\Delta$ for the $j^{th}$ block. Specifically, a predetermined value (for example, $\Delta$) may be added to respective initial values of the $K_j$ compression ratios. If a result of adding the predetermined value to the largest compression ratio $R_j+(K_j-1)\Delta$ is less than 1, the sums of the $K_j$ initial values and the predetermined value may be used as updated values of the $K_j$ weighting factors. In some other cases, if the result of adding the predetermined value to the largest compression ratio $R_j+(K_j-1)\Delta$ is equal to or greater than 1, it may mean that the current $K_j$ compression ratios are the largest compression ratios within an allowable range, and thus the updated values of the $K_j$ compression ratio are set to be equal to their respective initial values. In other words, the initial values of the $K_j$ compression ratios remain unchanged. After block 176, the method goes back to block 130 and continues to subsequent blocks.

In block 178, when the updated values of the weighting factors corresponding to the first operation branch and the $$K_j^{th}$$

operation branch of the $K_j$ operation branches are smaller than the preset weighting factor threshold, the updated values of the $K_j$ compression ratio are set to be equal to their respective initial values. If the updated values of the weighting factors corresponding to the first operation branch and the $$K_j^{th}$$

operation branch of the $K_j$ operation branches both are smaller than the preset weighting factor threshold, it may mean that the $j^{th}$ block to be compressed doesn't present an obvious tendency for the smallest or largest one of the $K_j$ compression ratios for compression. In this case, the compression ratio suitable for the $j^{th}$ block may be between the smallest one and largest one of the $K_j$ compression ratios. Accordingly, the updated values of the $K_j$ compression ratio are set to be equal to their respective initial values. In other words, the initial values of the $K_j$ compression ratios remain unchanged. After block 178, the method continues to subsequent blocks 180 and 190. More details about blocks 180 and 190 may refer to the descriptions in conjunction with FIG. 1, and will not be elaborated herein.

In a specific embodiment, taking FIG. 5B as an example, $K_j$=3, and the initial values of the compression ratios of the 3 operation branches are $R_j$, $R_j+\Delta$ and $R_j+2\Delta$, respectively. Assuming the preset weighting factor threshold is 0.5, if an updated value of the weighting factor of the first operation branch is greater than or equal to 0.5 after the forward propagation and the backward propagation to the replacement neural network have been iteratively performed for M times, it means the weighting factor of the first operation branch is significantly larger than that of the second and third operation branches. Then, the initial values of the three compression ratios may be subtracted by a predetermined value z to generate three new values $R_j-\Delta$, $R_j$ and $R_j+\Delta$. If $R_j-\Delta$ is greater than 0, the three new values $R_j-\Delta$, $R_j$ and $R_j+\Delta$ may be set as updated values of the three compression ratios. If an updated value of the weighting factor of the third operation branch is greater than or equal to 0.5, it means that the weighting factor of the third operation branch is significantly larger than that of the first and second operation branches. Then, a predetermined value $\Delta$ may be added to the initial values of the three compression ratios to generate three new values $R_j+\Delta$, $R_j+2\Delta$ and $R_j+3\Delta$. If $R_j+3\Delta$ is less than 1, the three new values $R_j+\Delta$, $R_j+2\Delta$ and $R_j+3\Delta$ may be set as updated values of the three compression ratio. If an updated value of the weighting factor of the second operation branch is greater than or equal to 0.5, or update values of the weighting factors of all three operation branches are less than 0.5, updated values of the three compression ratios are set to be equal to their initial value. In other words, the initial values of the three compression ratios remain unchanged.

Figure 7:
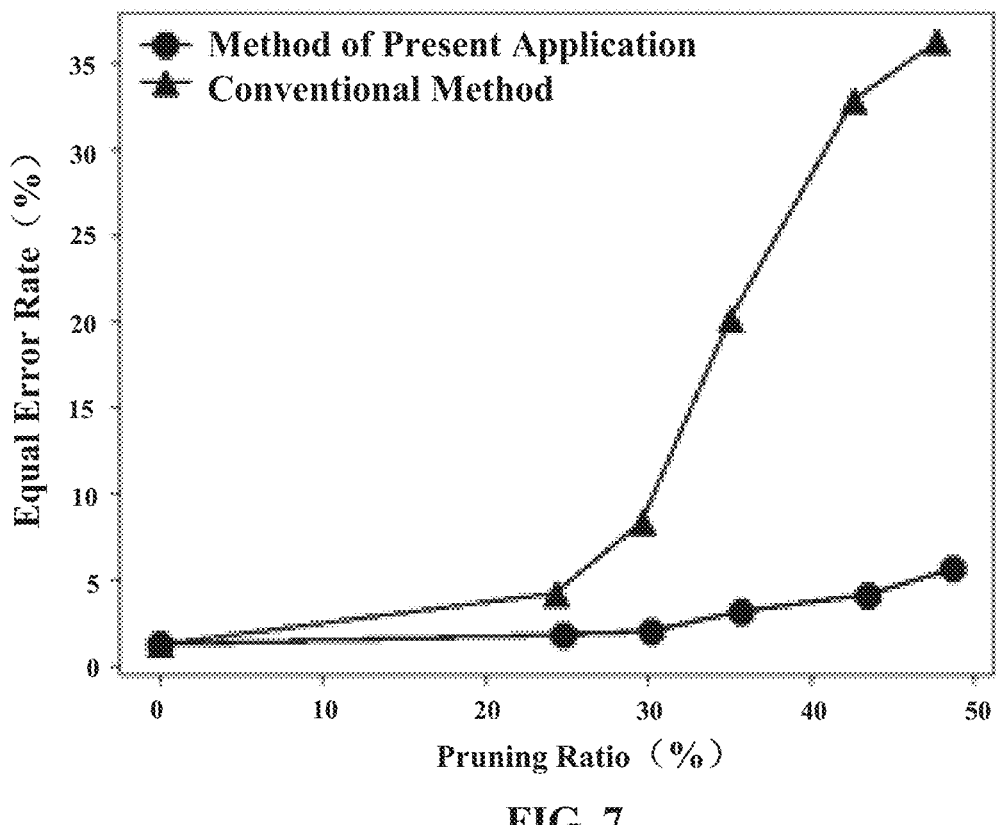
FIG. 7 illustrates a performance comparison diagram between the method for compressing a neural network of the present application and a traditional compression method based on sensitivity analysis.

FIG. 7 illustrates a diagram showing a comparison between results of compressing a voiceprint recognition neural network based on resnet 34 by the method for compressing a neural network of the present application and a traditional compression method based on sensitivity analysis. In FIG. 7, the horizontal axis represents a pruning ratio (pruning ratio=1-compression ratio), and the vertical axis represents an equal error rate which is a common performance index in the voiceprint recognition neural network. A lower equal error rate may mean a better neural network performance. It can be seen from FIG. 7 that, under different pruning ratios, the performance of the neural network compressed by the method of this application is better than that of the neural network compressed by the traditional compression method based on sensitivity analysis. Moreover, as the pruning ratio increases, the performance gap is getting bigger.

Figure 8:
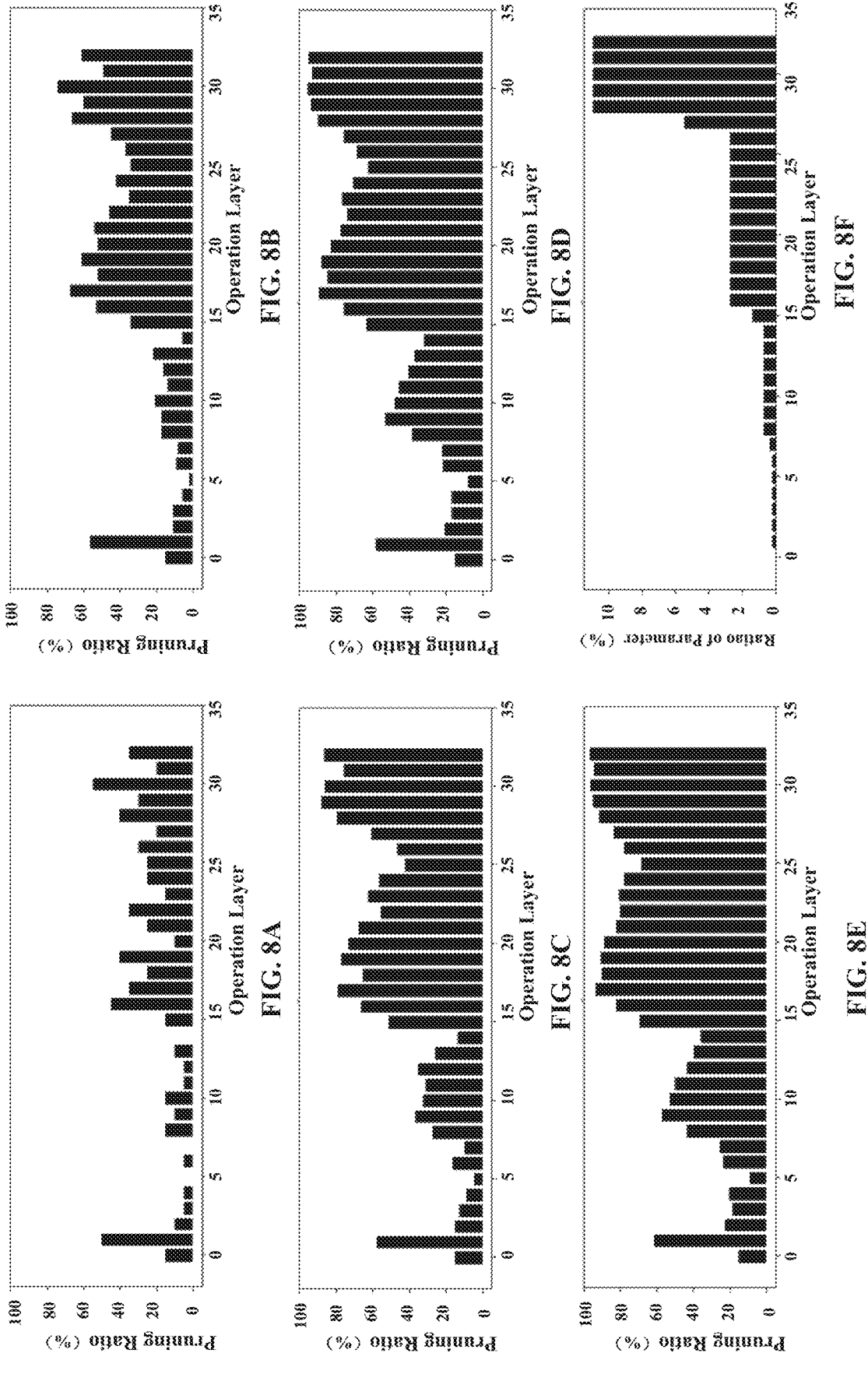
FIG. 8A, FIG. 8B, FIG. 8C, FIG. 8D and FIG. 8E illustrate distribution diagrams of actual pruning ratios of respective operation layers under different target pruning ratios.
FIG. 8F illustrates ratios of the numbers of parameters of respective operation layers to a total number of parameters of the neural network model before compression.

In order to study a compression effect to the neural network model under different pruning ratios, different pruning ratios and corresponding scan steps $\Delta$ of the compression ratio in Table 1 are simulated. FIG. 8A, FIG. 8B, FIG. 8C, FIG. 8D and FIG. 8E show distribution diagrams of pruning ratios of respective operation layers after the neural network model is compressed by the method of this application with target pruning ratios of 30%, 52%, 70%, 82% and 85%, respectively. FIG. 8F illustrates ratios of the numbers of parameters of respective operation layers to a total number of parameters of the neural network model before compression. It can be seen that, as the target pruning ratio increases, the pruning ratios of respective operation layers of the compressed neural network model generally increases accordingly.

TABLE 1

| Target Pruning Ratio | 30% | 52% | 70% | 82% | 85% |
|---|---|---|---|---|---|
| Scan Step $\Delta$ of Compression Ratio | 5% | 1% | 0.5% | 0.5% | 0.5% |

Figure 9:
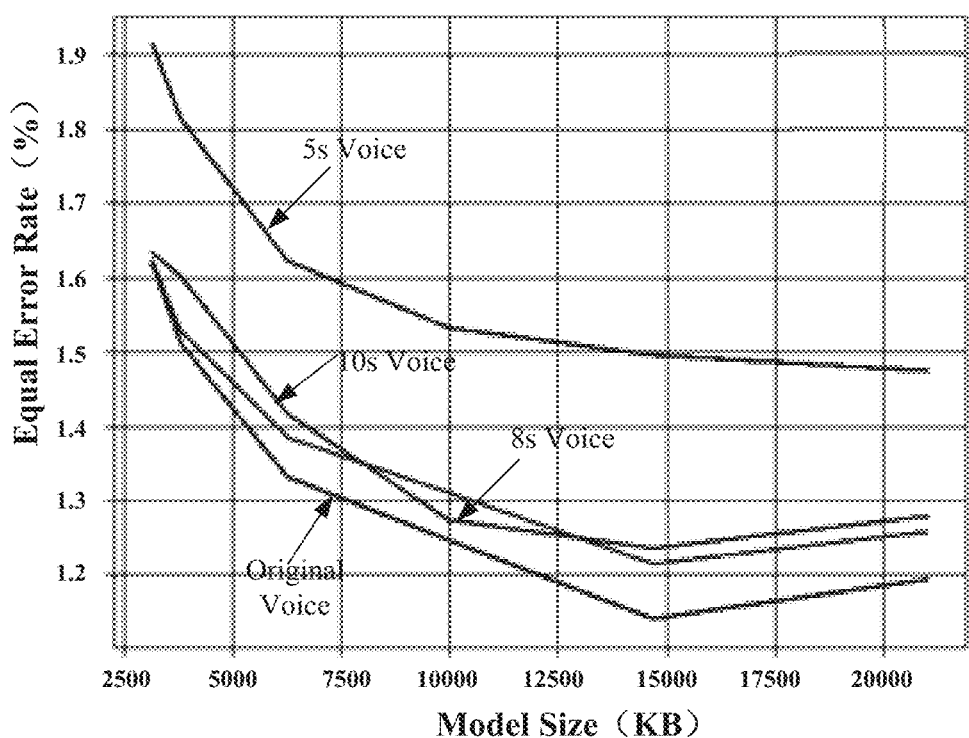
FIG. 9 illustrates a distribution diagram of equal error rates of a neural network compressed by method of the present application at different pruning ratios.

Table 2 shows values of equal error rates when a voiceprint recognition neural network model is compressed by the method of the present application at different pruning ratios. FIG. 9 graphically shows the values of equal error rates in Table 2, where the horizontal axis represents a size of the compressed model, and the vertical axis represents a value of the equal error rate. Specifically, a voxceleb dataset, a voxceleb2 dataset or other open source voice samples obtained from the Internet may be used. These voice samples may be preprocessed to a length of 5 s, 8 s, or 10 s, or keep their original lengths. The original model, and compressed models with pruning ratios of 30%, 52.5%, 70.16%, 81.84% and 84.98% are tested on the above voice samples to obtain their corresponding equal error rate values. It can be seen from Table 2 and FIG. 9 that, even for the compressed model with a pruning ratio of 84.98%, when compared with the original model, the performance loss (i.e., a difference between the equal error rates) is within 0.45%. As can be seen, the performance of the neural network model compressed by the method of the present application decreases little, even it is compressed with a higher pruning ratio.

TABLE 2

| | 5 s Voice | 8 s Voice | 10 s Voice | Original Voice | Model Size (KB) |
|---|---|---|---|---|---|
| Original Model | 1.474% | 1.257% | 1.278% | 1.193% | 21017 |
| Pruning Ratio 30% | 1.495% | 1.214% | 1.235% | 1.140% | 14697 |
| Pruning Ratio 52.5% | 1.532% | 1.310% | 1.273% | 1.246% | 9985 |
| Pruning Ratio 70.16% | 1.622% | 1.384% | 1.416% | 1.331% | 6272 |
| Pruning Ratio 81.84% | 1.813% | 1.527% | 1.601% | 1.511% | 3817 |
| Pruning Ratio 84.98% | 1.914% | 1.622% | 1.633% | 1.617% | 3156 |

Figure 10:
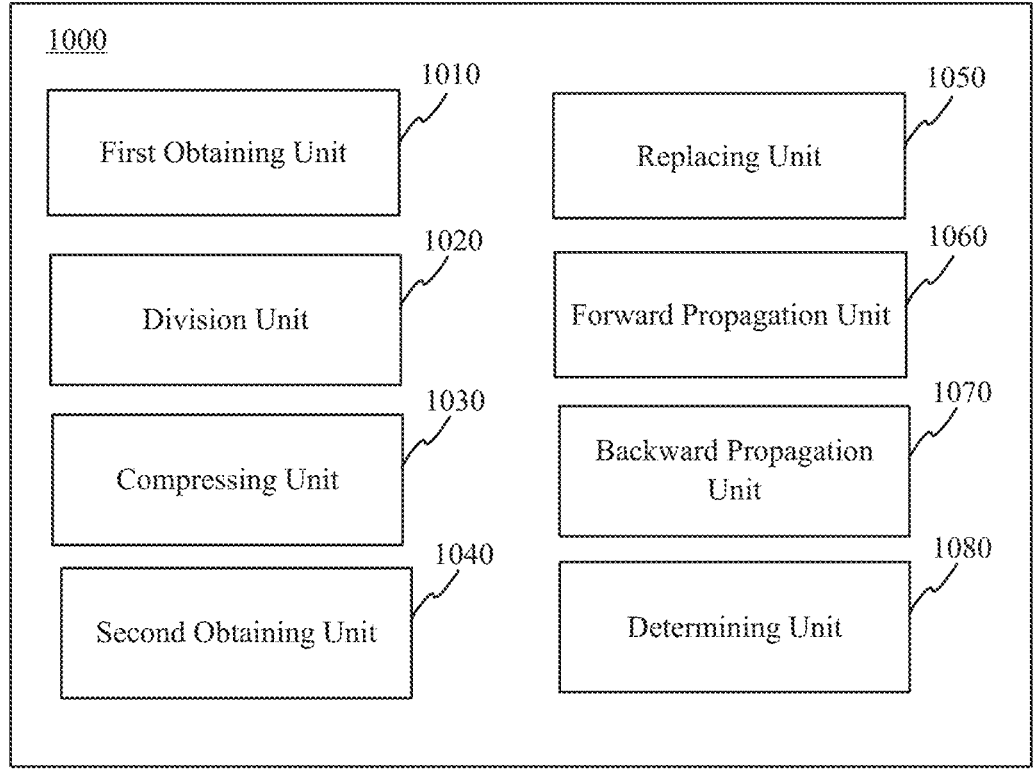
FIG. 10 illustrates a block diagram of a device for compressing a neural network according to an embodiment of the present application.

According another embodiment of the present application, a device for compressing a neural network is provided. As shown in FIG. 10, a device 1000 for compressing a neural network includes: a first obtaining unit 1010, a division unit 1020, a compressing unit 1030, a second obtaining unit 1040, a replacing unit 1050, a forward propagation unit 1060, a backward propagation unit 1070, and a determining unit 1080. The first obtaining unit 1010 is configured for obtaining an original neural network to be compressed, the original neural network including one or more operation layers to be compressed, each operation layer including one or more operation channels to be compressed, each operation channel including one or more operation kernels to be compressed, and each operation kernel including one or more parameters to be compressed. The division unit 1020 is configured for dividing all parameters to be compressed of the original neural network into J blocks to be compressed, where J is an integer greater than 1. The compressing unit 1030 is configured for compressing a $j^{th}$ block of the J blocks with $K_j$ different compression ratios to generate $K_j$ operation branches, where j and $K_j$ are integers, $1 \leq j \leq J$, and $K_j \geq 1$. The second obtaining unit 1040 is configured for obtaining, for the $j^{th}$ block, a set of $K_j$ weighting factors corresponding to the respective $K_j$ operation branches, where the $K_j$ weighting factors have respective initial values. The replacing unit 1050 is configured for replacing the $j^{th}$ block with the $K_j$ operation branches weighted by the set of $K_j$ weighting factors, to generate a replacement neural network. The forward propagation unit 1060 is configured for performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ block. The backward propagation unit 1070 is configured for performing backward propagation to the replacement neural network based on the preset dataset, where, for the $j^{th}$ block, updated values of the $K_j$ weighting factors are calculated based on a model loss of the replacement neural network relative to the original neural network. The determining unit 1080 is configured for determining, for the $j^{th}$ block, an operation branch corresponding to a maximum value of the updated values of the $K_j$ weighting factors as a compressed $j^{th}$ block. More details about the device 1000 may refer to the above corresponding method described in conjunction with FIGS. 1 to 9, and will not be elaborated herein.

More embodiments are provided below to describe the method and device for compressing a neural network of the present application.

As noted above, in order to facilitate deployment of a neural network on hardware, neural networks are usually compressed, such as being pruned and quantized. Specifically, quantization refers to the use of low bit-width binary numbers instead of high bit-width binary numbers to represent parameter values in the neural network, thereby compressing the neural network. FIG. 11A and FIG. 11B illustrate schematic diagrams of a uniform quantization scheme in prior art and a hybrid quantization scheme of the present application, respectively. In a typical neural network quantization method, the parameter values used in all operation layers of the neural network are quantized to a uniform bit-width. Referring to an example shown in FIG. 11A, before quantization, parameter values of convolutional layers (for example, conv1, conv2, etc.) and a fully connected layer (for example, fc) in a neural network 1100 are all represented by 32-bit floating-point numbers (fp 32); while, after quantization, these parameter values are represented by 8-bit fixed-point numbers. In other examples, more-bit numbers or less-bit numbers (that is, with higher or lower accuracy) can also be used to quantize the parameter values used in various operation layers of the neural network. It should be noted that the accuracy loss caused by quantizing the parameter values of the neural network is usually related to the quantization accuracy. For example, if the parameter values used in the neural network are uniformly quantized from 32-bit floating-point numbers to 8-bit fixed-point numbers or 4-bit fixed-point numbers, the accuracy loss of quantization to 4-bit numbers may be significantly higher than that of quantization to 8-bit numbers.

The inventors of the present application have found that, in prior art, all operation layers in the neural network are usually quantized with the same quantization accuracy, but sensitivities of different operation layers to the quantization accuracy is not the same. For example, quantization of some operation layers to 8 bits may cause a large accuracy loss of the neural network, while an accuracy loss of quantizing some other operation layers to even 4 bits may be within an acceptable range. In view of this, a hybrid quantization solution is provided in this application, which may use different quantization accuracies for different operation layers. For example, as shown in FIG. 11B, before quantization, the convolutional layers and the fully connected layer in the neural network 1100 all use 32-bit floating-point numbers to represent parameter values. However, after quantization, the second convolutional layer conv2, which is sensitive to quantization, uses higher-accuracy 8-bit fixed-point numbers to represent its parameter values; the fully connected layer fc, which is not sensitive to quantization, uses lower-accuracy 4-bit fixed-point numbers to represent its parameter values; and the first convolutional layer conv1, which has a middle-level sensitivity to quantization, uses 6-bit fixed-point numbers to represent its parameter values. This solution that adaptively adjusts the quantization accuracy based on the quantization sensitivity of different operation layers can achieve a higher compression ratio with less accuracy loss. Furthermore, in view of the tradeoff between the compression ratio and the accuracy loss of the neural network, the present application creatively solved the problem of how to reasonably allocate different quantization accuracies among multiple operation layers. For example, for a neural network with 50 operation layers, if there are 4 different quantization accuracies for each layer, there are $4^{50}$ different quantization schemes for the neural network. Thus, due to the large amount of calculation, it is obviously not feasible to find the best quantization scheme from the $4^{50}$ different quantization schemes through brute force search.

In view of the above, the present application provides a method for compressing a neural network. In this method, after obtaining an original neural network, operation layers to be compressed in the neural network are compressed with a plurality of different compression ratios to generate one or more operation branches corresponding to each operation layer to be compressed. Then, one or more weighting factors corresponding to the one or more operation branches are generated for each operation layer, and the neural network is retrained based on a preset dataset, including performing forward propagation and backward propagation to the neural network. In the forward propagation process, for each operation layer, the one or more operation branches are used to replace the operation layer, and a weighted sum operation is performed on one or more operation results generated by the one or more operation branches with the one or more weighting factors and the result of the weighted sum operation is used as an output of the operation layer. In the backward propagation process, updated values of the one or more weighting factors are calculated based on a model loss of the neural network. Then, for each operation layer, an operation branch corresponding to the maximum value of the updated values of the one or more weighting factors is determined as a compressed operation layer, so as to form a compressed neural network. By introducing the weighting factors, the method can retrain the neural network based on a small dataset of training samples, update the weighting factors based on the model loss, and select the operation branch corresponding to the largest weighting factor in each operation layer as the compressed operation layer. Therefore, a suitable compression ratio (or quantization accuracy) that can take into account the accuracy of the neural network is selected for the operation layers. Compared with the aforementioned brute force search, the method of the present application reduces the amount of calculation significantly.

The method for compressing a neural network of the present application will be described in detail below with reference to the drawings. FIG. 12 illustrates a flowchart of a method 1200 for compressing a neural network according to an embodiment of the present application, which specifically includes the following blocks 1210-1280.

In block 1210, an original neural network is obtained, where the original neural network includes J operation layers to be compressed, and J is an integer greater than 1.

Details about the original neural network may refer to block 110 of the above method 100, and will not be elaborated herein.

In some embodiments, all the operation layers in the original neural network may be operation layers to be compressed, that is, the number of operation layers to be compressed J is equal to a total number of the operation layers (for example, for FIG. 2, J=L). In some embodiments, the original neural network may include operation layers that do not require compression. In other words, the number J of the operation layers to be compressed may be less than the total number of the operation layers (for example, for FIG. 2, J<L). It may vary based on the feature of the original neural network or specific application requirements whether to compress all the operation layers in the original neural network, or which operation layers are to be selected for compression.

In block 1220, the $j^{th}$ operation layer to be compressed among the J operation layers is compressed with $K_j$ different compression ratios to generate $K_j$ operation branches, respectively, where j and $K_j$ are integers, $1 \leq j \leq J$, and $K_j \geq 1$.

In order to improve the accuracy of calculation, parameters of the operation layers to be compressed of the original neural network obtained in block 1210 are usually represented by high-accuracy numbers, such as floating-point numbers with a high bit-width. In some examples, 32-bit floating-point numbers may be used to represent the parameters of the operation layer to be compressed. Taking a convolution layer to be compressed with 5×5 convolution kernels as an example, the 25 weighting values (i.e., parameters) in each convolution kernel are represented by 32-bit floating-point numbers. Therefore, an effective method for compressing the original neural network is to replace the high bit-width parameters in the operation layer of the neural network with low bit-width parameters.

In some embodiments, the J operation layers of the original neural network may be compressed with the same number of compression ratios, that is, the numbers of compression ratios $K_1$, $K_2$, . . . , and $K_J$ respectively used by the J operation layers to be compressed may be equal to each other. In some embodiments, the numbers of compression ratios $K_1$, $K_2$, . . . , and $K_J$ respectively used by the J operation layers to be compressed may be different, or a part of the compression ratios are equal to each other. The number of compression ratios used by each operation layer to be compressed can be determined based on a sensitivity of the operation layer to compression ratio, or a target compression ratio for the neural network.

In some embodiments, parameters of the $j^{th}$ operation layer to be compressed of the original neural network are represented by No-bit binary numbers. After the operation layer is compressed with the $K_j$ different compression ratios to generate $K_j$ operation branches, the parameter values of these $K_j$ operation branches are represented by $N_{1j}$-bit, $N_{2j}$-bit, . . . , $N_{K_j j}$-bit binary numbers respectively, where $K_j$ is an integer greater than or equal to 1, $N_{0j}$, $N_{1j}$, $N_{2j}$, . . . , $N_{K_j j}$ are integers greater than or equal to 1, and $N_{1j}$, $N_{2j}$, . . . , $N_{K_j j}$ are less than or equal to No. Specifically, the different operation branches corresponding to an operation layer to be compressed may have the same size and structure as this operation layer to be compressed, but the parameters of the operation branches may have accuracies different from the corresponding parameters in the original operation layer. It should be noted that the number of operation branches $K_j$ may also be determined based on the hardware platform for deploying the original neural network. If the hardware platform only supports calculation of binary numbers of $K_j$ different bit-widths, at most $K_j$ operation branches can be generated for each operation layer to be compressed.

In an example, the parameters of the $j^{th}$ operation layer to be compressed of the original neural network may be represented by 32-bit floating-point numbers (fp 32), and the operation layer to be compressed may be compressed with 4 different compression ratios (i.e., $K_j$=4) to generate 4 operation branches. Parameters of the 4 operation branches are represented by 16-bit floating-point numbers (fp 16), 8-bit fixed-point numbers (int 8), 6-bit fixed-point numbers (int 6), and 4-bit fixed-point numbers (int 4), respectively. After compression, data sizes of the parameters of the 4 operation branches are reduced to 50%, 25%, 18.75%, and 12.5% of the data size of the original operation layer, respectively. It should be noted that the bit-widths of parameters and the numbers of operation branches above are only exemplary. In other examples, the parameters of the operation layer to be compressed and the operation branches generated after compression may be represented by higher or lower bit-width numbers, for example, eight-accuracy floating-point numbers (fp 256), four-accuracy floating-point numbers (fp 128), double-accuracy floating-point numbers (fp 64), 2-bit fixed-point numbers (int 2), 1-bit fixed-point numbers (int 1), and the number of operation branches may be greater than or less than 4.

In some embodiments, each parameter of the operation layer to be compressed can be compressed according to the following Equation (11):

$$r = S(q - Z) \tag{11}$$

In Equation (11), r represents a parameter of the operation layer to be compressed, q represents a parameter after compression, a constant S represents the compression scale, and a constant Z represents the zeropoint value. For example, if the smallest parameter among all the parameters in a certain operation layer to be compressed is a, the largest parameter is b, and the compressed parameter is represented by an 8-bit fixed-point number in the range [−127, 128], then, Z=(b−a)/2, and S=(b−a)/256. That is, for a certain operation layer to be compressed and a certain compression accuracy, the constants S and Z are fixed. For example, after the calculation with Equation (11), the parameter r represented by a 32-bit floating-point number in the operation layer to be compressed can be mapped to a parameter q represented by an 8-bit fixed-point number in the range of [−127, 128].

In block 1230, a set of $K_j$ weighting factors corresponding to the respective $K_j$ operation branches are obtained for the $j^{th}$ operation layer to be compressed, where the $K_j$ weighting factors have respective initial values.

In some embodiments, the initial values of the weighting factors may be automatically generated by software. In other embodiments, the initial values of the weighting factors may be predetermined and provided by a user. Since the sensitivity of each operation layer to the compression ratio is unknown before the neural network is retrained, in a preferred embodiment, the initial values of the $K_j$ weighting factors corresponding to the respective $K_j$ operation branches, which represent different compression ratio, are set to be equal to each other.

For the foregoing example of 32-bit floating-point number parameters, 16-bit floating-point numbers, 8-bit fixed-point numbers, 6-bit fixed-point numbers, and 4-bit fixed-point numbers may be used to represent compressed parameters of the 4 operation branches respectively, and the 4 corresponding weighting factors may be represented by $\beta1$, $\beta_2$, $\beta_3$, and $\beta_4$, respectively. In an embodiment, initial values of these 4 weighting factors may be set to zero. It could be appreciated that, in other examples, the initial values of the weighting factors can also be set to other equal or unequal values.

In block 1240, for the $j^{th}$ operation layer to be compressed, the operation layer to be compressed is replaced with the $K_j$ operation branches weighted by the set of $K_j$ weighting factors to generate a replacement neural network.

Figures 13A, 13B:
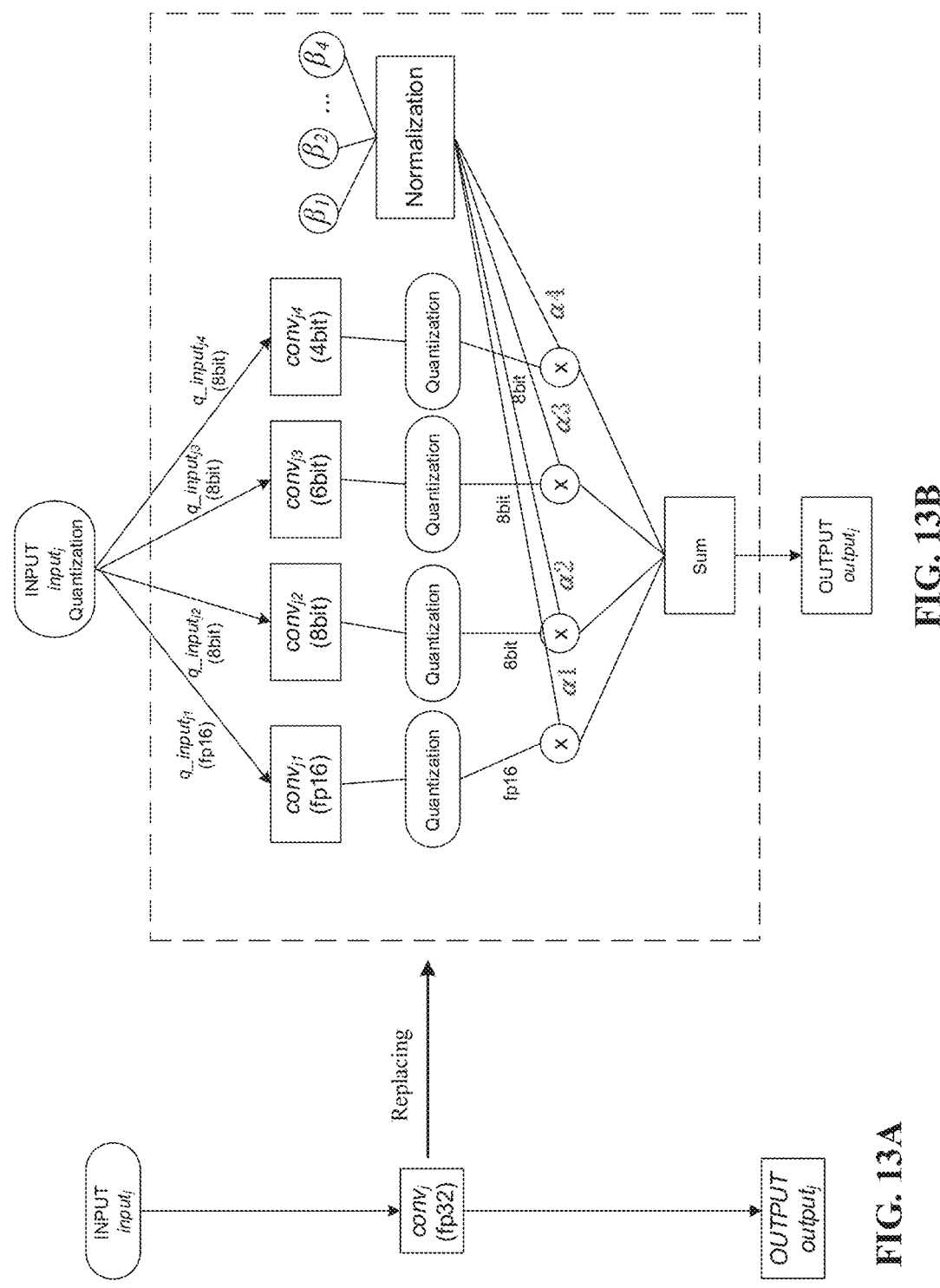
FIG. 13A and FIG. 13B illustrate block diagrams of forward propagation to an operation layer of a neural network according to an embodiment of the present application.

Referring to FIG. 13A and FIG. 13B, the $j^{th}$ operation layer (i.e., the convolutional layer $conv_j$) of the original neural network is taken as an example. Assuming that 4 different compression ratios are used to compress the $j^{th}$ operation layer and 4 operation branches $conv_{j1}$, $conv_{j2}$, $conv_{j3}$ and $conv_{j4}$ are generated, the $j^{th}$ operation layer $conv_j$ is replaced with the 4 operation branches weighted by the 4 weighting factors ($\beta_1$, $\beta_2$, $\beta_3$ and $\gamma_4$), i.e., $\beta_1 conv_{j1}$, $\beta_2 conv_{j2}$, $\beta_3 conv_{j3}$ and $\beta_4 conv_{j4}$. After completing the above replacement operation for all the J operation layers to be compressed, a replacement neural network is generated.

Although the foregoing description has been made by taking the operation layer being a convolutional layer as an example, it could be appreciated that similar replacement operations can also be implemented for a batch normalization layer, an activation layer, or a fully connected layer.

In block 1250, forward propagation to the replacement neural network is performed based on a preset dataset, where a weighted sum operation is performed on the $K_j$ operation results generated by the $K_j$ operation branches with the $K_j$ weighting factors and a result of the weighted sum operation is used as an output of the $j^{th}$ operation layer.

Details about the preset dataset may refer to block 160 of the above method 100, and will not be elaborated herein.

Continuing to FIG. 13A and FIG. 13B, the forward propagation to the replacement neural network is further described by replacing the operation layer $conv_j$ with four operation branches $conv_{j1}$, $conv_{j2}$, $conv_{j3}$ and $conv_{j4}$ as an example. Specifically, FIG. 13A illustrates a normal forward propagation process to the $j^{th}$ operation layer $conv_j$, and FIG. 13B illustrates the forward propagation to the four operation branches $conv_{j1}$, $conv_{j2}$, $conv_{j3}$ and $conv_{j4}$ (i.e., $K_j$=4) which replace the $j^{th}$ operation layer $conv_j$.

First, for the operation layer $conv_j$, the input data may be compressed before the forward propagation to generate $K_j$ compressed input data corresponding to the $K_j$ operation branches respectively, where the accuracies of the $K_j$ compressed input data correspond to accuracies of the parameter values of the $K_j$ operation branches respectively. For example, the input data may be quantized to generate the $K_j$ compressed input data, and the bit-widths of the $K_j$ compressed input data are equal to or similar to bit-widths of the parameters of the $K_j$ operation branches, respectively.

In some embodiments, the compression of the input data can be expressed by Equation (12):

$$q\_input_{jk} = quantize_k(input_j) \tag{12}$$

In Equation (12), $input_j$ represents the input data of the $j^{th}$ operation layer to be compressed, the operator "$quantize_k$" represents a quantizer corresponding to the $k^{th}$ operation branch of the $K_j$ operation branches (k=1, 2, . . . , $K_j$), and $q\_input_{jk}$ represents the quantized input data corresponding to the $k^{th}$ operation branch of the $j^{th}$ operation layer. When $K_j$=4 as shown in FIG. 13B, the input data $input_j$ of the $j^{th}$ operation layer $conv_j$ is quantized to generate 4 quantized input data $q\_input_{j1}$, $q\_input_{j2}$, $q\_input_{j3}$ and $q\_input_{j4}$ respectively corresponding to the 4 operation branches $conv_{j1}$, $conv_{j2}$, $conv_{j3}$ and $conv_{j4}$. The 4 quantized input data are represented by 16-bit floating-point numbers (fp 16), 8-bit fixed-point numbers (int 8), 8-bit fixed-point numbers (int 8) and 8-bit fixed-point numbers (int 8), respectively. By quantizing the input data, not only the storage space of the neural network model can be saved, but also the calculation process between the quantized input data and the operation branches can be accelerated. For example, the convolution operation of the quantized input data and the operation branches can be changed from multiplication and addition operations to floating-point numbers to multiplication and addition operations to integers. It should be noted that the bit-width of the quantized input data is not limited to the above example, which can be adjusted based on calculation accuracy requirements in specific applications. Referring to FIG. 2, it could be appreciated that, when the $j^{th}$ operation layer $conv_j$ is the first operation layer to be compressed, the input data $input_j$ is the input data 210 shown in FIG. 2; and when the $j^{th}$ operation layer is another operation layer except for the first operation layer to be compressed, the input data $input_j$ is the output data of the $(j-1)^{th}$ operation layer to be compressed.

Next, certain operations may be performed on the $K_j$ replaced operation branches and the $K_j$ quantized input data to generate operation results corresponding to the $K_j$ operation branches. A weighted sum operation may be performed on the $K_j$ operation results with the corresponding $K_j$ weighting factors to generate a summation, and the summation may be used as an output result of this operation layer. Taking the $j^{th}$ operation layer being a convolutional layer $conv_j$ as an example, the above operation and weighting steps can be given by Equation (13):

$$output_j = \sum_{k=1}^{K_j} \alpha_{jk} * quantize_k(conv_{jk} \circ q\_input_{jk}) \tag{13}$$

In Equation (13), "$conv_{jk} \circ q\_input_{jk}$" represents a convolution operation performed on the $k^{th}$ convolution branch $conv_k$ in the $j^{th}$ operation layer and the $k^{th}$ quantized input data $q\_input_{jk}$, the operator "$quantize_k$" represents a quantization operation performed on the convolution result of the $k^{th}$ convolution branch, and $\alpha_k$ is a normalized representation of the weighting factor $\beta_{jk}$, which represents the $k^{th}$ normalized weighting factor in the $j^{th}$ operation layer. In some examples, the normalization of the weighting factor $\beta_{jk}$ can be performed by using the following "softmax" function, that is, the following Equation (14):

$$\alpha_{jk} = \frac{e^{\beta_{jk}}}{\sum_{k=1}^{K_j} e^{\beta_{jk}}} \; (k = 1, 2, \dots , K_j) \qquad (14)$$

It could be appreciated that those skilled in the art can understand that the weighting factor $\beta_{jk}$ can also be normalized by using other functions according to specific applications. Continuing to taking FIG. 13B as an example, when $K_j=4$, the above Equation (13) can be expressed as the following Equation (15):

$$\text{output}_j = \alpha_{j1} * \text{quantize}_1\left(conv_{j1} \circ q\_input_{j1}\right) + \qquad (15)$$
$$\alpha_{j2} * \text{quantize}_2\left(conv_{j2} \circ q\_input_{j2}\right) +$$
$$\alpha_{j3} * \text{quantize}_3\left(conv_{j3} \circ q\_input_{j3}\right) + \alpha_{j4} * \text{quantize}_4\left(conv_{j4} \circ q\_input_{j4}\right)$$

The specific operation process will not be elaborated herein.

It should be noted that, the operation layer to be compressed is taken as a convolutional layer for description in the example of FIG. 13B, but it could be appreciated that the forward propagation to the activation layer, the fully connected layer and the like can be performed in a similar manner. Moreover, in some embodiments, a plurality of operation layers of the original neural network may be optimized and combined to form a network block, and then the network block can be used as a unit for compression and forward propagation. For example, by referring to operational relationships and data of each operation layer to be compressed in the neural network, and extracting the relationships between adjacent operation layers to be compressed, two or more operation layers to be compressed may be combined to form a network block for further processing, so as to reduce undesired intermediate output and improve operation efficiency. For example, the convolutional layer and the activation layer are very common in convolutional neural networks and always appear in pairs, and thus the convolutional layer and the activation layer may be combined to form a network block (Conv+ReLU), which as a whole may be used as an operation layer or unit to be compressed for subsequent operations. In other examples, the convolutional layer may be combined with the pooling layer (Conv+Pooling), the convolutional layer may be combined with the batch normalization layer and the activation layer (Conv+BN+ReLU), and so on.

It should also be noted that, although the process of forward propagation is described above by taking the compression of input data as an example, in other embodiments, the input data may not be compressed, and the original input data is used for the operation with the operation branches.

In block 1260, the backward propagation to the replacement neural network is performed based on the preset dataset, where, for the $j^{th}$ operation layer to be compressed, updated values of the $K_j$ weighting factors are calculated based on a model loss of the replacement neural network relative to the original neural network.

As described above, compressing the parameters of the original neural network (for example, replacing higher bit-width parameters with lower bit-width parameters) may result in a loss of accuracy of the original neural network, while computing resources may be saved. Therefore, the replacement neural network can be backward-propagated to adjust its parameters, and reduce its accuracy loss. It should be noted that, when performing backward propagation to the replacement neural network, the technical solution of the present application only adjusts and updates weighting factors of each operation layer to be compressed, but does not adjust other parameters of the neural network (for example, weighting values of the convolutional layer).

In some embodiments, when performing backward propagation to the replacement neural network, the $K_j$ weighting factors of the $j^{th}$ operation layer to be compressed can be updated according to the following Equation (16):

$$\beta'_{jk} = \beta_{jk} - \lambda \frac{\partial Loss}{\partial \beta_{jk}}, (k = 1, \dots , K_j) \qquad (16)$$

In Equation (16), $\beta_{jk}$ represents an initial value of the $k^{th}$ weighting factor of the $j^{th}$ operation layer, $\beta'_{jk}$ represents an updated value of the $k^{th}$ weighting factor of the $j^{th}$ operation layer, Loss represents a model loss function of the replacement neural network relative to the original neural network, and $\lambda$ represents a learning rate and can be defined by the user.

In some embodiments, the model loss function Loss includes a loss function part and a performance index term. Specifically, the loss function part is related to an application type of the neural network, such as classification, positioning, detection or segmentation. The performance index part is related to a hardware index of the hardware platform on which the neural network is to be deployed, such as a storage space, a number of floating-point operations, a delay time or a power consumption, etc.

The following takes the compression of a storage space of a classification neural network on the hardware platform as an example to illustrate the model loss function Loss. Specifically, the model loss function Loss can be given by the following Equation (17):

$$Loss = loss1 * loss2 \qquad (17)$$

In Equation (17), loss1 represents a loss function part, and loss2 represents a performance index part.

For the classification neural network, the loss function part loss1 can be further given by a cross-entropy function as shown in Equation (18):

$$loss1 = CrossEntropy(pred, label) = -\sum_{i}^{I} label(i) \log(pred(i)), \qquad (18)$$
$$(i = 1, \dots , I)$$

In Equation (18), label represents a classification label, which is usually represented by a one-hot code; I represents a total dimension of the classification labels, for example, for the ImageNet dataset, the total dimension of the classification labels I is 1000; label (i) represents the $i^{th}$ classification label of all I classification labels, where if the $i^{th}$ classification is true, label (i) is 1, otherwise label (i) is 0; and, correspondingly, pred (i) represents a probability that the $i^{th}$ classification is true.

The performance index part loss2 can be further given by a model size function shown in Equation (19):

$$loss\,2 = (\text{model\_size/model\_ref})^{\gamma} \qquad (19)$$

In Equation (19), model_size represents a model size of the neural network in training, whose unit is "bit". model_ref is a constant related to the neural network model, which is set to a number of bits of the model size of the neural network after quantization with a uniform quantization accuracy. For example, after the original neural network is uniformly quantized using 8-bit fixed-point numbers, model_ref equals to the total number of parameters of the original neural network multiplied by 8 bits. $\gamma$ is a hyper-parameter, which is used to balance the accuracy loss of the neural network model and the model size. When a neural network model with higher accuracy is required, the value of $\gamma$ can be set smaller, and when a smaller neural network model is required, the value of $\gamma$ can be set larger. That is, the value of $\gamma$ can be determined according to specific requirements. In some examples, the value of $\gamma$ ranges 0.05 to 5. More specifically, in some examples, the value of $\gamma$ ranges 0.25 to 0.5, which can balance the accuracy loss of the neural network model and the model size better.

In some embodiments, the model size model_size of the neural network in training in the above Equation (19) can be expressed by the following Equation (20):

$$\text{model\_size} = \sum_{j=1}^{J} \sum_{k=1}^{K_j} \alpha_{jk} * \text{size}(conv_{jk}) \qquad (20)$$

In Equation (20), J represents the total number of operation layers to be compressed in the neural network. j represents a series number of each operation layer to be compressed, and $1 \le j \le J$. $K_j$ represents a total number of operational branches in the $j^{th}$ operation layer to be compressed, k represents a series number of the operational branch in this operation layer, and $1 \le k \le K_j$. $conv_{jk}$ represents a convolutional layer of the $k^{th}$ operational branch in the $j^{th}$ operation layer. $\text{size}(conv_{jk})$ represents a number of bits of the convolutional layer $conv_{jk}$. Referring to the example shown in FIG. 13B, the values (i.e., $\text{size}(conv_{j1})$, $\text{size}(conv_{j2})$, size$(conv_{j3})$ and $\text{size}(conv_{j4})$) corresponding to the 4 operation branches of the $j^{th}$ layer are equal to the numbers of weight values of respective operation branches multiplied by 16, 8, 6, and 4, respectively. In addition, $\alpha_{jk}$ represents a normalized weighting factor corresponding to the $k^{th}$ operation branch in the $j^{th}$ operation layer, which can be obtained by the above Equation (14).

The above example illustrates the model loss function Loss by taking the compression of a storage space of the classification neural network on the hardware platform as an example. It could be appreciated that, the model loss function Loss can be adjusted according to specific application scenarios. In some embodiments, the loss function part loss1 in the model loss function Loss may be adjusted according to the application type of the neural network (for example, classification, positioning, detection, segmentation, etc.). Taking image processing as an example, the classification neural network can be used to determine the classification of a given image; the positioning neural network can be used to determine a specific location of a target in the given image; the detection neural network can be used to identify and locate a target in a given image when a target type and number are uncertain; and the segmentation neural network can divide the given image into multiple components, which can be used to locate a boundary of the target in the image. Similar to the above-mentioned classification neural network, in which the loss function part loss1 is related to the classification labels and the probability of each recognized classification, when adjusting the loss function part loss1, the positioning neural network needs to consider the location parameters of the target in the image, the detection neural network needs not only to consider the type and number of targets, but also to consider positions of these targets in the image; and the segmentation neural network needs to consider the position and shape parameters of the target in the image. In some embodiments, according to the specific application type of the neural network, the loss function part loss1 may include one or more of a group consisting of the following: a cross-entropy function, an absolute value loss function, a logarithmic loss function, a square loss function, an exponential loss function, a hinge loss function, a perceptron function or other suitable loss functions. Correspondingly, the performance index part loss2 in the model loss function Loss can be adjusted according to the hardware index of the hardware platform to be deployed (for example, a storage space, a number of floating-point operations, a delay time or a power consumption, etc.). For example, if an index related to a number of floating-point operations, a delay time, or a power consumption of the compressed neural network is set for the hardware platform to be deployed, the model_size and model_ref parts related to the storage space in Equation (19) can be replaced with parameters related to the number of floating-point operations, the delay time or the power consumption, thereby forming the adjusted performance index part loss2.

In some embodiments, after block 1260 is completed, the operation branch corresponding to the maximum value of the updated values of the $K_j$ weighting factors may be determined as the compressed $j^{th}$ operation layer, and accordingly the J operation layers to be compressed are replaced with J compressed operation layers, so as to obtain the compressed neural network. This can reduce the amount of calculations required to compress the neural network.

In the embodiment shown in FIG. 12, after block 1260, the replacement neural network can be further retrained one or more times based on the preset dataset to obtain a compressed neural network with better performance.

In block 1270, the forward propagation and the backward propagation to the replacement neural network are iteratively performed for multiple times based on the preset dataset. During the iteration process, a model size of the replacement neural network is calculated based on the operation branch corresponding to the maximum value of the updated values of the $K_j$ weighting factors, and it is determined whether a change in the model size of the replacement neural network calculated after each iteration of the iteration process is within a preset range. If the change is within the preset range, the method proceeds with block 1280. If the change is not within the preset range, the method 1200 goes back to block 1250, and continues to iteratively performing the forward propagation and backward propagation blocks.

An objective of retraining the replacement neural network based on the preset dataset (including forward propagation and backward propagation) is to update the $K_j$ weighting factors assigned to each operation layer to be compressed, so as to reach a tradeoff between the accuracy loss of the replacement neural network and the model size, to get an optimized hybrid quantization scheme. During the iteration process, for the $j^{th}$ operation layer to be compressed, the updated values of the $K_j$ weighting factors obtained in a backward propagation can be assigned to the $K_j$ weighting factors to be used in a forward propagation next to the backward propagation. After the forward propagation and backward propagation to the replacement neural network are iteratively performed for a plurality of times, if a change in the model size of the replacement neural network calculated after an iteration of the iteration process is within a preset range, it means that the training process tends to converge and can be ended; otherwise, it is desired to continue training the replacement neural network, and continue to perform the forward propagation and backward propagation to update the weighting factors.

It should be noted that, for the first operation of the forward propagation and backward propagation, since there is no previous iteration process, an initial model size of the original neural network can be used as the model size of the neural network before the first operation, and such initial model size can be used to calculate a change in the model size of the replacement neural network after the first operation of the forward propagation and backward propagation.

It should also be noted that, in some cases, there may be a situation where the retraining process does not converge. That is, the above change cannot converge within the preset range after multiple iterations. Thus, a maximum number of iterations can be preset. After the number of iterations reaches the maximum number of iterations, the method may be forced to exit from the iteration process, and the retraining of the replacement neural network is ended.

In some embodiments, the model size of the replacement neural network can be calculated according to the following Equation (21):

$$\text{model\_size}' = \sum_{j=1}^{J} \sum_{k=1}^{K_j} \alpha_{jk}' * \text{size}(conv_{jk}) \qquad (21)$$

The same symbols in Equation (20) and Equation (21) have the same meaning, model_size' represents the model size of the replacement neural network, which is determined by the following Equation (22).

$$\alpha_{jk}' = \begin{cases} 1, & \left(k = \underset{k=1,\dots,K_j}{\arg\max} \beta_k\right) \\ 0, & \left(k \neq \underset{k=1,\dots,K_j}{\arg\max} \beta_k\right) \end{cases} \qquad (22)$$

In Equation (22), the operator "arg max" represents taking the maximum value of the $K_j$ weighting factors. In other words, when calculating the model size of the replacement neural network, only the size of the convolutional layer of the operation branch corresponding to the largest weighting factor among all the operation branches in each operation layer to be compressed is included in the model size of in the replacement neural network, and other operation branches are discarded. The size of the replacement neural network model can be calculated during each iteration through the above Equations (21) and (22). Then, a difference between two model sizes of the respective replacement neural networks calculated in two adjacent iterations of the iteration process is compared with a range preset by the user. If the difference is within the preset range, it means that there is no change or the change is small to the model size of the replacement neural networks before and after the iteration, the training can be ended. Otherwise, the replacement neural network is further trained based on the preset dataset.

In block 1280, for the $j^{th}$ operation layer to be compressed, the operation branch corresponding to the maximum value of the updated values of the $K_j$ weighting factors is determined as the compressed $j^{th}$ operation layer.

As mentioned above, when the replacement neural network is retrained based on the preset dataset and the convergence condition is reached, it means that the accuracy loss and the model size of the replacement neural network have been relatively balanced. For the $j^{th}$ operation layer to be compressed, the operation branch corresponding to the maximum value of the updated values of the $K_j$ weighting factors can be directly determined as the compressed $j^{th}$ operation layer, and accordingly the J operation layers to be compressed are replaced with J compressed operation layers, so as to obtain the compressed neural network.

Since the parameters of the compressed neural network are represented by numbers with lower bit-width than those of the original neural network, the compressed neural network may take up less storage space and computation resources, and can be more easily deployed on hardware platforms with limited resources.

Figure 14A:
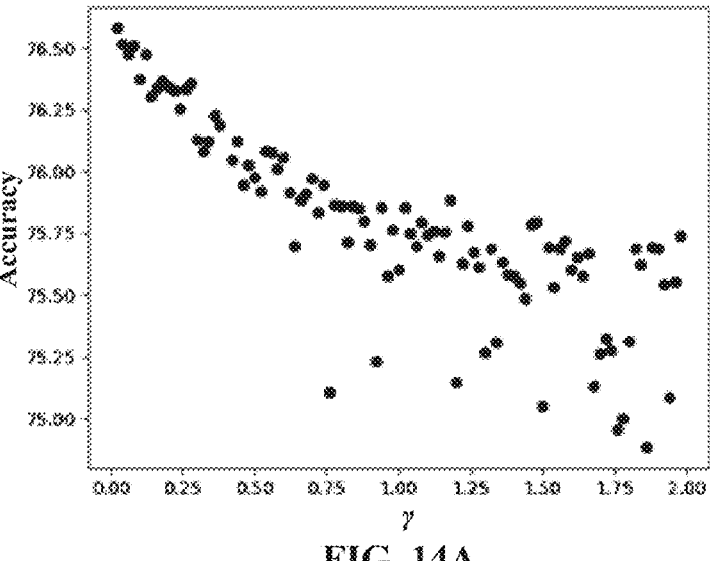
FIG. 14A, FIG. 14B, and FIG. 14C illustrate relationships between a hyper-parameter $\gamma$, an accuracy and a model size of a network model in a method for compressing a neural network according to an embodiment of the present application.
Figure 14B:
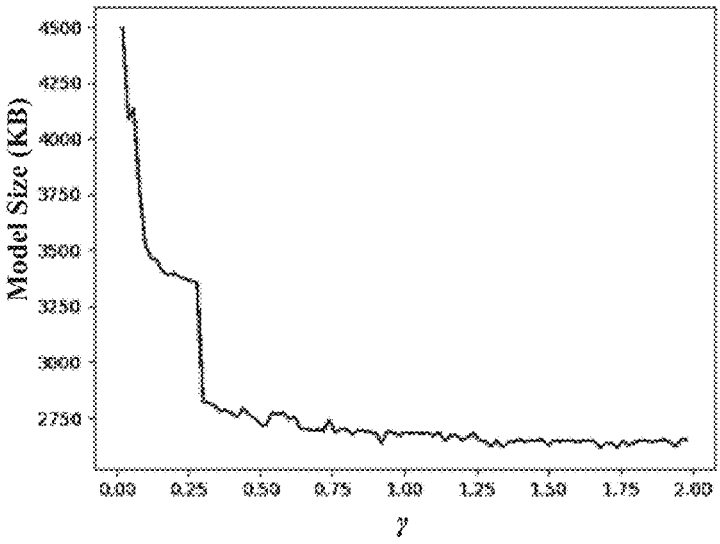
Figure 14C:
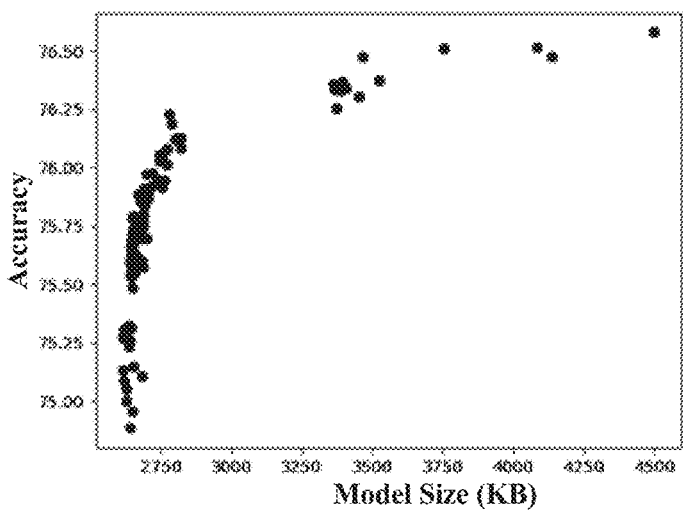
Figure 15:
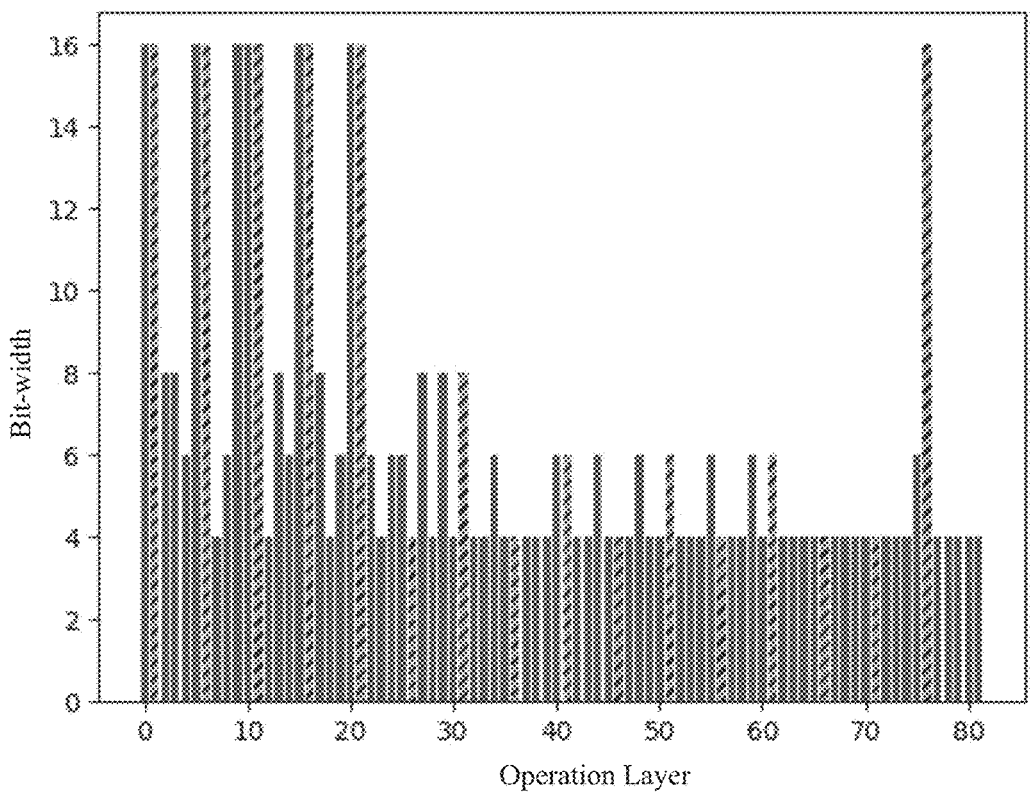
FIG. 15 illustrates a schematic diagram of a compression result of a neural network model according to an embodiment of the present application.

Referring to FIGS. 14A, 14B and 14C, different test results of applying the method for compressing a neural network of the present application on an EfficientNet-b0 network model are shown. For example, FIG. 14A shows changes in the accuracy of compressed the neural network model when different hyper-parameter $\gamma$ are used, FIG. 14B shows changes in the model size of the compressed neural network model when different hyper-parameter $\gamma$ are used, and FIG. 14C shows a correlation between the model size and the accuracy of the compressed neural network. The above test results can be used to guide the selection of hyper-parameter $\gamma$ under different accuracy and model size requirements. It can be seen that, as the value of the hyper-parameter $\gamma$ increases, the model becomes smaller and smaller, but the accuracy becomes lower and lower. The reason may be that the increment of the hyper-parameter $\gamma$ represents that the model size accounts for a larger proportion of the model loss function Loss. In an extreme case, the loss function part loss1 may be omitted, and the compressed model may converge to choose the configuration with the most economical hardware. However, in practical applications, it is expected that the accuracy loss is small while the neural network model is compressed, and thus the hyper-parameter $\gamma$ should not be set too large. After many simulation studies by the inventors, it is advisable to set the hyper-parameter $\gamma$ between 0.25 and 0.5. FIG. 15 shows bit-widths used by parameters of different operation layers after being hybridly quantized by the method for compressing a neural network of the present application, when the hyper-parameter $\gamma$ is set to 0.36. In FIG. 15, the slashed columns correspond to the depthwise convolution (DWC) layers, and the other columns represents other operation layers except the DWC layers. It can be seen from FIG. 15 that, most of the front-end operation layers in the neural network are quantized with a higher bit-width, while the back-end operation layers are quantized with a lower bit-width, that is because the front-end operation layers have fewer parameters and have greater impact on the network performance. In addition, the DWC layer, which has higher computational complexity and greater impact on the network performance, also generally uses a higher bit-width for quantization than its adjacent operation layers. Table 3 below shows the comparison of the model sizes and the accuracies of an original neural network (FP 32), a neural network compressed by a uniform 8-bit quantization scheme, and a neural network compressed by the hybrid quantization scheme using the method for compressing a neural network of the present application. As can be seen from Table 3, the hybrid quantization scheme using the method of the present application can achieve better classification performance (i.e., 76.228% accuracy) when the model compression ratio exceeds 86%.

TABLE 3

| Neural Network | Model Size (KB) | Accuracy ( %) |
| --- | --- | --- |
| FP32 | 20454 (32 bit/per weight) | 76.840 |
| Uniform 8-Bit Quantization Scheme | 5114 (8 bit/per weight) | 69.33 |
| Hybrid Quantization Scheme | 2780 (average 4.35 bit/per weight) | 76.228 |

Figure 16:
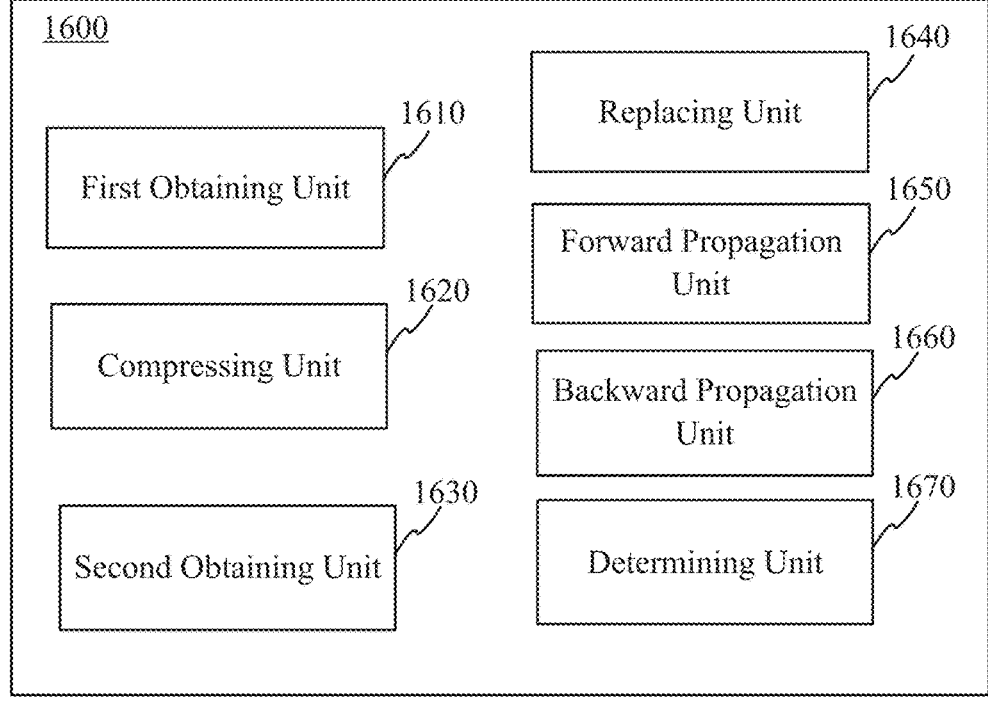
FIG. 16 illustrates a block diagram of a device for compressing a neural network according to an embodiment of the present application.

According another embodiment of the present application, a device for compressing a neural network is provided. As shown in FIG. 16, a device 1600 for compressing a neural network includes: a first obtaining unit 1610, a compressing unit 1620, a second obtaining unit 1630, a replacing unit 1640, a forward propagation unit 1650, a backward propagation unit 1660, and a determining unit 1670. The first obtaining unit 1610 is configured for obtaining an original neural network to be compressed, the original neural network including J operation layers to be compressed, where J is an integer greater than 1. The compressing unit 1620 is configured for compressing a $j^{th}$ operation layer of the J operation layers with $K_j$ different compression ratios to generate $K_j$ operation branches, where j and $K_j$ are integers, $1 \leq j \leq J$, and $K_j \geq 1$. The second obtaining unit 1630 is configured for obtaining, for the $j^{th}$ operation layer, a set of $K_j$ weighting factors corresponding to the respective $K_j$ operation branches, where the $K_j$ weighting factors have respective initial values. The replacing unit 1640 is configured for replacing the $j^{th}$ operation layer with the $K_j$ operation branches weighted by the set of $K_j$ weighting factors, to generate a replacement neural network. The forward propagation unit 1650 is configured for performing forward propagation to the replacement neural network based on a preset dataset, where a weighted sum operation is performed on $K_j$ operation results generated by the $K_j$ operation branches with the $K_j$ weighting factors and a result of the weighted sum operation is used as an output of the $j^{th}$ operation layer. The backward propagation unit 1660 is configured for performing backward propagation to the replacement neural network based on the preset dataset, where, for the $j^{th}$ operation layer, updated values of the $K_j$ weighting factors are calculated based on a model loss of the replacement neural network relative to the original neural network. The determining unit 1670 is configured for determining, for the $j^{th}$ operation layer, an operation branch corresponding to a maximum value of the updated values of the $K_j$ weighting factors as a compressed $j^{th}$ operation layer. More details about the device 1600 may refer to the above corresponding method described in conjunction with FIGS. 11 to 15, and will not be elaborated herein.

In some embodiments, the device for compressing a neural network may be implemented as one or more of an application-specific integrated circuits (ASIC), a digital signal processor (DSP), a digital signal processing device (DSPD), a programmable logic device (PLD), a field programmable gate array (FPGA), a controller, a microcontroller, a microprocessor or other electronic components. In addition, the device embodiments described above are only for the purpose of illustration. For example, the division of the units is only a logical function division, and there may be other divisions in actual implementations. For example, multiple units or components may be combined or may be integrate into another system, or some features can be omitted or not implemented. In addition, the displayed or discussed mutual coupling, direct coupling or communication connection may be indirect coupling or indirect communication connection through some interfaces, devices or units in electrical or other forms. The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In other embodiments, the device compressing a neural network can also be implemented in the form of a software functional unit. If the functional unit is implemented in the form of a software functional unit and sold or used as an independent product, it can be stored in a computer readable storage medium and can be executed by a computer device. Based on this understanding, the essential of the technical solution of this application, or the part that contributes to the conventional technology, or all or part of the technical solution, can be embodied in the form of a software product, which is stored in a storage medium. The software product may include a number of instructions to enable a computer device (for example, a personal computer, a mobile terminal, a server, or a network device, etc.) to perform all or part of steps of the method in each embodiment of the present application.

In other embodiments of the present application, an electronic device is provided. The electronic device includes a processor and a storage device. The storage device is configured to store a computer program that can run on the processor. When the computer program is executed by the processor, the processor is caused to execute the method for compressing a neural network in the foregoing embodiments. In some embodiments, the electronic device may be a mobile terminal, a personal computer, a tablet computer, a server, etc.

In other embodiments of the present application, a non-transitory computer-readable storage medium is provided. The non-transitory computer-readable storage medium stores a computer program, and when the computer program is executed by a processor, the method for compressing a neural network is performed. In some embodiments, the non-transitory computer-readable storage medium may be a flash memory, a read only memory (ROM), an electrically programmable ROM, an electrically erasable and programmable ROM, register, hard disk, removable disk, CD-ROM, or any other form of non-transitory computer-readable storage medium known in the art.

Those skilled in the art will be able to understand and implement other changes to the disclosed embodiments by studying the specification, disclosure, drawings and appended claims. In the claims, the wordings "comprise", "comprising", "include" and "including" do not exclude other elements and steps, and the wordings "a" and "an" do not exclude the plural. In the practical application of the present application, one component may perform the functions of a plurality of technical features cited in the claims. Any reference numeral in the claims should not be construed as limit to the scope.

What is claimed is:

1. A method for compressing a neural network, comprising:

obtaining an original neural network to be compressed, the original neural network comprising a plurality of parameters to be compressed;

dividing the plurality of parameters of the original neural network into J blocks to be compressed, where J is an integer greater than 1;

compressing a $j^{th}$ block of the J blocks with $K_j$ different compression ratios to generate $K_j$ operation branches, where j and $K_j$ are integers, $1 \leq j \leq J$, and $K_j \geq 1$;

obtaining, for the $j^{th}$ block, a set of $K_j$ weighting factors corresponding to the respective $K_j$ operation branches, where the $K_j$ weighting factors have respective initial values;

replacing the $j^{th}$ block with the $K_j$ operation branches weighted by the set of $K_j$ weighting factors, to generate a replacement neural network;

performing forward propagation to the replacement neural network based on a preset dataset to generate $K_j$ operation results, where a weighted sum operation is performed on the $K_j$ operation results with the $K_j$ weighting factors and a result of the weighted sum operation is used as an output of the $j^{th}$ block, and where the $K_j$ operation results is generated by:

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the $K_j$ compressed input data to generate the $K_j$ operation results;

performing backward propagation to the replacement neural network based on the preset dataset, where, for the $j^{th}$ block, updated values of the $K_j$ weighting factors are calculated based on a model loss of the replacement neural network relative to the original neural network, wherein the model loss is determined based on a sum of a loss function determined based on an application type of the original neural network, and a performance index related to a hardware index of a hardware platform on which the original neural network is to be deployed; and determining, for the $j^{th}$ block, an operation branch corresponding to a maximum value of the updated values of the $K_j$ weighting factors as a compressed $j^{th}$ block.

2. The method of claim 1, wherein the original neural network comprising one or more operation layers to be compressed and each operation layer comprising one or more operation channels to be compressed, and dividing the plurality of parameters of the original neural network into J blocks to be compressed comprises: dividing parameters in the same operation layer into a respective block to be compressed.

3. The method of claim 2, wherein compressing a $j^{th}$ block of the J blocks with $K_j$ different compression ratios comprises:

calculating L1 norms of all operations channels of the $j^{th}$ block, respectively;

selecting $P_1$, $P_2$, . . . , $P_{Kj}$ operations channels with the smallest L1 norms from all operations channels of the $j^{th}$ block based on the $K_j$ compression ratios of the $j^{th}$ block, where $P_1$, $P_2$, . . . , $P_{Kj}$ are integers greater than or equal to 1, and less than J; and setting values of all parameters in the $P_1$, $P_2$, . . . , $P_{Kj}$ operations channels of the $j^{th}$ block to zero to generate the $K_j$ operation branches, respectively.

4. The method of claim 1, wherein the original neural network comprising one or more operation layers to be compressed, each operation layer comprising one or more operation channels to be compressed and each operation channel comprising one or more operation kernels to be compressed, and dividing the plurality of parameters of the original neural network into J blocks to be compressed comprises: dividing parameters in the same operation channel into a respective block to be compressed.

5. The method of claim 4, wherein compressing a $j^{th}$ block of the J blocks with $K_j$ different compression ratios comprises:

calculating L1 norms of all operations kernels of the $j^{th}$ block, respectively;

selecting $P_1$, $P_2$, . . . , $P_{Kj}$ operations kernels with the smallest L1 norms from all operations kernels of the $j^{th}$ block based on the $K_j$ compression ratios of the $j^{th}$ block, where $P_1$, $P_2$, . . . , $P_{Kj}$ are integers greater than or equal to 1, and less than J; and setting values of all parameters in the $P_1$, $P_2$, . . . , $P_{Kj}$ operations kernels of the $j^{th}$ block to zero to generate the $K_j$ operation branches, respectively.

6. The method of claim 1, wherein the original neural network comprising one or more operation layers to be compressed, each operation layer comprising one or more operation channels to be compressed, each operation channel comprising one or more operation kernels to be compressed, and each operation kernel comprising one or more parameters to be compressed, and dividing the plurality of parameters of the original neural network into J blocks to be compressed comprises: dividing parameters in the same operation kernel into a respective block to be compressed.

7. The method of claim 6, wherein compressing a $j^{th}$ block of the J blocks with $K_j$ different compression ratios comprises:

calculating absolute values of all parameters of the $j^{th}$ block, respectively;

selecting $P_1$, $P_2$, . . . , $P_{Kj}$ parameters with the smallest absolute values from all parameters of the $j^{th}$ block based on the $K_j$ compression ratios of the $j^{th}$ block, where $P_1$, $P_2$, . . . , $P_{Kj}$ are integers greater than or equal to 1, and less than J; and setting values of the $P_1$, $P_2$, . . . , $P_{Kj}$ parameters of the $j^{th}$ block to zero to generate the $K_j$ operation branches, respectively.

8. The method of claim 1, wherein the $K_j$ compression ratios of the $j^{th}$ block have respective initial values $R_j$, $R_j+\Delta$, $R_j+2\Delta$, . . . , $R_j+(K_j-1)\Delta$, where $0<R_j<1$, $0<\Delta<1$, and $0<(R_j+(K_j-1)\Delta)<1$.

9. The method of claim 8, further comprising:

performing the forward propagation and the backward propagation to the replacement neural network iteratively for multiple times based on the preset dataset;

wherein in the iteration process of the forward propagation and the backward propagation, the updated values of the $K_j$ weighting factors obtained in a backward propagation serve as weighting factors to be used in a forward propagation next to the backward propagation.

10. The method of claim 9, further comprising:

after the forward propagation and the backward propagation to the replacement neural network are iteratively performed for M times based on the preset dataset, obtaining updated values of the $K_j$ compression ratios based on the updated values of the $K_j$ weighting factors.

11. The method of claim 10, wherein obtaining updated values of the $K_j$ compression ratios based on the updated values of the $K_j$ weighting factors comprises:

setting the updated values of the $K_j$ compression ratio to be smaller than their respective initial values, when an updated value of the weighting factor corresponding to a first operation branch of the $K_j$ operation branches is greater than or equal to a preset weighting factor threshold;

setting the updated values of the $K_j$ compression ratio to be greater than their respective initial values, when an updated value of the weighting factor corresponding to a $$K_j^{th}$$

operation branch of the $K_j$ operation branches is greater than or equal to the preset weighting factor threshold; and setting the updated values of the $K_j$ compression ratio to be equal to their respective initial values, when the updated values of the weighting factors corresponding to the first operation branch and the $$K_j^{th}$$

operation branch of the $K_j$ operation branches are smaller than the preset weighting factor threshold.

12. The method of claim 9, further comprising:

calculating, in the iteration process, a model size of the replacement neural network based on the operation branch corresponding to the maximum value of the updated values of the $K_j$ weighting factors;

obtaining a change in the model size of the replacement neural network calculated after each iteration of the iteration process; and stopping the iteration process when the change is within a preset range.

13. The method of claim 1, wherein the application type of the original neural network comprises: classification, positioning, detection or segmentation.

14. The method of claim 1, wherein the one or more operation layers to be compressed comprises a convolutional layer, an activation layer, a batch normalization layer, a pooling layer, or a fully connected layer.

15. The method of claim 1, further comprising:

normalizing values of the $K_j$ weighting factors before performing the weighted sum operation on the $K_j$ operation results generated by the $K_j$ operation branches with the $K_j$ weighting factors.

16. The method of claim 1, wherein the hardware index of a hardware platform on which the original neural network is to be deployed comprises: a storage space, a number of floating-point operations, a delay time or a power consumption.

17. A device for compressing a neural network, comprising:

a processor; and a memory, wherein the memory stores program instructions that are executable by the processor, and when executed by the processor, the program instructions cause the processor to perform:

obtaining an original neural network to be compressed, the original neural network comprising a plurality of parameters to be compressed;

dividing the plurality of parameters of the original neural network into J blocks to be compressed, where J is an integer greater than 1;

compressing a $j^{th}$ block of the J blocks with $K_j$ different compression ratios to generate $K_j$ operation branches, where j and $K_j$ are integers, $1 \leq j \leq J$, and $K_j \geq 1$;

obtaining, for the $j^{th}$ block, a set of $K_j$ weighting factors corresponding to the respective $K_j$ operation branches, where the $K_j$ weighting factors have respective initial values;

replacing the $j^{th}$ block with the $K_j$ operation branches weighted by the set of $K_j$ weighting factors, to generate a replacement neural network;

performing forward propagation to the replacement neural network based on a preset dataset to generate $K_j$ operation results, where a weighted sum operation is performed on the $K_j$ operation results with the $K_j$ weighting factors and a result of the weighted sum operation is used as an output of the $j^{th}$ block, and where the $K_j$ operation results is generated by:

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the A compressed input data to generate the $K_j$ operation results;

performing backward propagation to the replacement neural network based on the preset dataset, where, for the $j^{th}$ block, updated values of the $K_j$ weighting factors are calculated based on a model loss of the replacement neural network relative to the original neural network, wherein the model loss is determined based on a sum of a loss function determined based on an application type of the original neural network, and a performance index related to a hardware index of a hardware platform on which the original neural network is to be deployed; and determining, for the $j^{th}$ block, an operation branch corresponding to a maximum value of the updated values of the $K_j$ weighting factors as a compressed $j^{th}$ block.

18. A non-transitory computer-readable storage medium having stored therein instructions that, when executed by a processor, cause the processor to perform a method for compressing a neural network, the method comprising:

obtaining an original neural network to be compressed, the original neural network comprising a plurality of parameters to be compressed;

dividing the plurality of parameters of the original neural network into J blocks to be compressed, where J is an integer greater than 1;

compressing a $j^{th}$ block of the J blocks with $K_j$ different compression ratios to generate $K_j$ operation branches, where j and $K_j$ are integers, $1 \leq j \leq J$, and $K_j \geq 1$;

obtaining, for the $j^{th}$ block, a set of $K_j$ weighting factors corresponding to the respective $K_j$ operation branches, where the $K_j$ weighting factors have respective initial values;

replacing the $j^{th}$ block with the $K_j$ operation branches weighted by the set of $K_j$ weighting factors, to generate a replacement neural network;

performing forward propagation to the replacement neural network based on a preset dataset to generate $K_j$ operation results, where a weighted sum operation is performed on the $K_j$ operation results with the $K_j$ weighting factors and a result of the weighted sum operation is used as an output of the $j^{th}$ block, and where the $K_j$ operation results is generated by:

compressing an input data from the preset dataset to generate $K_j$ compressed input data corresponding to the $K_j$ operation branches respectively, where the $K_j$ compressed input data have $K_j$ different accuracies corresponding to the $K_j$ different compression ratios of the $K_j$ operation branches respectively; and performing the forward propagation on the $K_j$ replaced operation branches and the $K_j$ compressed input data to generate the $K_j$ operation results;

performing backward propagation to the replacement neural network based on the preset dataset, where, for the $j^{th}$ block, updated values of the $K_j$ weighting factors are calculated based on a model loss of the replacement neural network relative to the original neural network, wherein the model loss is determined based on a sum of a loss function determined based on an application type of the original neural network, and a performance index related to a hardware index of a hardware platform on which the original neural network is to be deployed; and determining, for the $j^{th}$ block, an operation branch corresponding to a maximum value of the updated values of the $K_j$ weighting factors as a compressed $j^{th}$ block.

\* \* \* \* \*